(12) United States Patent
Dempster

(10) Patent No.: US 8,350,396 B2
(45) Date of Patent: Jan. 8, 2013

(54) WATER-CURRENT PADDLEWHEEL-BASED ENERGY-GENERATING UNIT HAVING A TAPERED PARTIAL COVERING STRUCTURE

(76) Inventor: Harry Edward Dempster, Newbury Park, CA (US)

( * ) Notice: Subject to any disclaimer, the term of this patent is extended or adjusted under 35 U.S.C. 154(b) by 485 days.

(21) Appl. No.: 12/725,910

(22) Filed: Mar. 17, 2010

(65) Prior Publication Data

US 2010/0237625 A1  Sep. 23, 2010

Related U.S. Application Data

(60) Provisional application No. 61/161,022, filed on Mar. 17, 2009.

(51) Int. Cl.
*F03B 13/00* (2006.01)
(52) U.S. Cl. ............................. 290/43; 290/54
(58) Field of Classification Search ............ 290/43, 290/54; 415/2.1, 3.1; 60/398
See application file for complete search history.

(56) References Cited

U.S. PATENT DOCUMENTS

| | | | | |
|---|---|---|---|---|
| 1,300,499 A | * | 4/1919 | Slagel | ............................ 416/194 |
| 3,541,588 A | | 11/1970 | Ragland | |
| 3,934,528 A | | 1/1976 | Horton et al. | |
| 4,084,918 A | * | 4/1978 | Pavlecka | ............................ 415/1 |
| 4,290,381 A | | 9/1981 | Penman | |
| 4,717,831 A | | 1/1988 | Kikuchi | |
| 4,960,363 A | * | 10/1990 | Bergstein | ....................... 415/3.1 |
| 5,969,430 A | * | 10/1999 | Forrey | ............................ 290/54 |
| 6,291,904 B1 | | 9/2001 | Carroll | |
| 6,759,757 B1 | | 7/2004 | Campbell | |
| 6,935,808 B1 | | 8/2005 | Dempster | |
| 7,352,074 B1 | | 4/2008 | Pas | |
| 7,521,816 B2 | * | 4/2009 | Helfrich | ............................ 290/54 |
| 2002/0145288 A1 | | 10/2002 | Van Breems | |
| 2007/0096472 A1 | | 5/2007 | Mondl | |
| 2010/0213716 A1 | * | 8/2010 | Santoro | ............................ 290/54 |

FOREIGN PATENT DOCUMENTS

WO  WO 02/093715 A1  11/2002

OTHER PUBLICATIONS

International Search Report and Written Opinion from corresponding PCT application No. PCT/US10/27652.

* cited by examiner

*Primary Examiner* — Tho D Ta
(74) *Attorney, Agent, or Firm* — Joseph G. Swan, P.C.

(57) ABSTRACT

Provided are, among other things, systems, methods, apparatuses and techniques for generating energy from water current. According to one representative embodiment, an apparatus includes: a paddlewheel having multiple individual paddles, an axis of rotation, a front side that is forward of the axis of rotation, and a rear side that is behind the axis of rotation; and a covering structure having a front portion that (a) covers a first part of the front side of the paddlewheel, leaving a second part of the front side of the paddlewheel uncovered by said front portion and (b) extends a distance forward of the front side of the paddlewheel, with the front portion of the covering structure being tapered, becoming thinner as it extends further forward of the paddlewheel.

23 Claims, 20 Drawing Sheets

WATER-CURRENT PADDLEWHEEL-BASED ENERGY-GENERATING UNIT HAVING A TAPERED PARTIAL COVERING STRUCTURE

This application claims the benefit of U.S. Provisional Patent Application Ser. No. 61/161,022, filed on Mar. 17, 2009, and titled "Water Current Energy Generation", which application is incorporated by reference herein as though set forth herein in full.

FIELD OF THE INVENTION

The present invention pertains to water-current energy-generating systems, such as tidal or river current energy-generating systems.

BACKGROUND

There are a variety of different conventional systems for generating energy from water current. However, improved energy-generating systems are always desirable, particularly systems that can provide improved efficiency, ease of manufacturing, ease of deployment, ease of use and/or ease of maintenance.

SUMMARY OF THE INVENTION

The present invention addresses these needs problem by providing, among other things, improved systems, methods, apparatuses and techniques for generating energy from water current.

Thus, one embodiment of the invention is directed to an apparatus that includes: a paddlewheel having multiple individual paddles, an axis of rotation, a front side that is forward of the axis of rotation, and a rear side that is behind the axis of rotation; and a covering structure having a front portion that (a) covers a first part of the front side of the paddlewheel, leaving a second part of the front side of the paddlewheel uncovered by said front portion and (b) extends a distance forward of the front side of the paddlewheel, with the front portion of the covering structure being tapered, becoming thinner as it extends further forward of the paddlewheel.

By virtue of the foregoing arrangement, it is often possible to generate usable energy more efficiently from water currents. For example, by diverting some of the water current away from one part of the paddlewheel (e.g., the top or the bottom) and toward the other part (e.g., the bottom or top, respectively), not only can that additional current be used to drive the motion of the paddlewheel, but less current is present to resist the movement of the paddlewheel when the paddles are moving in the direction opposite to that of the current flow.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

This application is related to currently pending U.S. patent application Ser. No. 11/554,587, filed on Oct. 31, 2006 (the '587 application), to U.S. Provisional Patent Application Ser. No. 60/731,584, filed on Oct. 31, 2005 (the '584 application), to U.S. Pat. No. 7,242,107 (the '107 patent), and to U.S. Pat. No. 6,860,219 (the '219 patent), all of which being incorporated by reference herein as though set forth herein in full.

The present disclosure presents multiple different embodiments. Those embodiments are described in separate sections below, typically corresponding to different use cases. However, neither this division into categories nor any of the category titles is not intended to be limiting in any manner whatsoever. To the contrary, while certain preferred use cases are identified below, the structures, apparatuses and systems described below typically can be used in a variety of different environments, conditions and circumstances.

Each of the energy-generation system embodiments described herein preferably employs: (1) an underwater variable-buoyancy energy-generating unit (having positive buoyancy in its operational state) that includes a main structure which functions as a housing or main support structure for the energy-generating unit; and (2) a re-floatable anchor to which the energy-generating unit is tethered using one or more cables or other flexible lines. Each such main structure and each such anchor preferably is fabricated primarily or substantially entirely from concrete (e.g., as described in the '219 patent). Similar fabrication and deployment techniques can be used across all embodiments discussed herein, e.g., including fabrication and deployment techniques described in connection with specific embodiments herein and/or the fabrication and deployment techniques described in the '587 application.

In each embodiment described below, the energy-generating unit is tethered to the re-floatable anchor using cables (e.g., steel cables). In certain embodiments, the depth of the energy-generating unit is desired to be adjustable, e.g., so that it can be initially placed or subsequently adjusted so as to be located within the maximum current stream and/or so that it can be adjusted over time based on changes in the water level (e.g., due to tides or changes in the amount of water in a river). In such cases, the anchor cables preferably are capable of being adjusted, e.g., by including a winch on the anchor, on the energy-generating unit, on the deployment vehicle or on the shore.

As will become apparent below, the preferred embodiments of the present invention employ a paddle wheel that is horizontally oriented when in use. Such an orientation has been found to usually capture more of the water current's energy than the use of a vertically oriented turbine or waterwheel.

Subsurface Wave Energy System.

Figure 1:
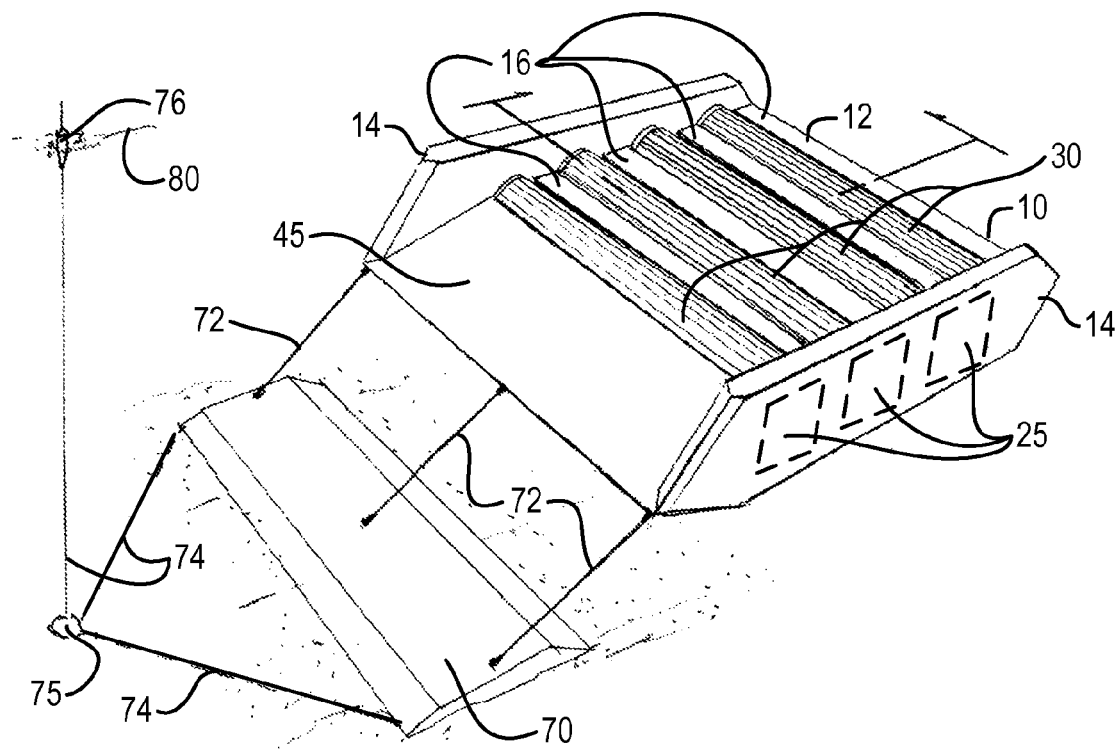
FIG. 1 is a top front perspective view of a subsurface wave energy system.

FIG. 1 depicts an ocean (or other body of water, e.g., lake) wave energy-generating system that principally includes an energy-generating unit 10 and an anchor 70. The energy-generating unit 10 preferably has a concrete main structure 12 (e.g., fabricated primarily or substantially entirely from concrete) that includes side walls 14, together with a front deck 45 and support baffles 16 that are attached to the side walls 14.

Figure 2:
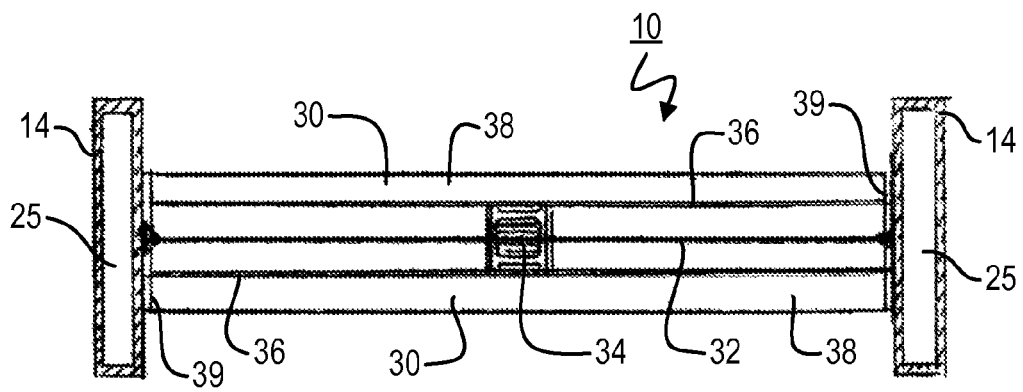
FIG. 2 is a center sectional view of an energy-generating unit for a subsurface wave energy system.

Also supported by the side walls 14 is a plurality of waterwheels (or paddle wheels) 30, with four such waterwheels 30 occupying at least 50% of the top surface of the energy-generating unit 10 in the present embodiment (although the number and surface-area coverage can differ in alternate embodiments). More specifically, as shown in FIG. 2, for each of the waterwheels 30, a center shaft 32 is fixedly attached to the side walls 14 and supports the fixed-position interior portion of an electrical generator 34 (the term "generator" being used herein in its most general sense to encompass a device for generation of any kind of electrical power, whether direct current or alternating current). The rotating exterior component of the generator 34, in turn, is attached to the interior surface of a pipe 36 that is capable of rotating around center shaft 32. The housing formed by pipe 36 preferably is watertight and gives added buoyancy to the overall energy-generating unit 10. At the same time, the paddles 38 of the subject waterwheel 30 are attached to the outer surface of pipe housing 36 at the proximal edges of the paddles 38 and, in addition, are attached to support panels 39 along their side edges.

As a result of this configuration, the force of an incoming wave current pushes the paddles 38, thereby rotating them and the pipe 36 to which they are attached, together with the rotating portion of the generator 34. The electricity that is produced preferably is carried off energy-generating unit 10 by a wire inside shaft 32. Although not shown, this wire preferably is connected to a cable (or a cabling system or grid) that carries the generated electricity to the shore. However, in alternate embodiments, particularly where the system is located far from shore, the generated electricity can be used to produce hydrogen, which is then stored for later pickup (e.g., as described in the '107 patent).

Figure 3A:
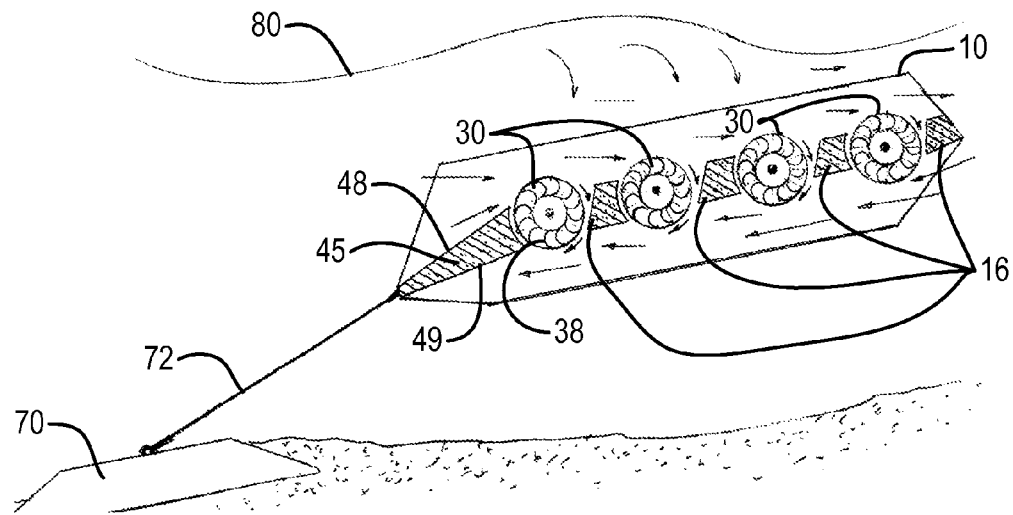
FIG. 3A is a left side center sectional view of a subsurface wave energy system.
Figure 3B:
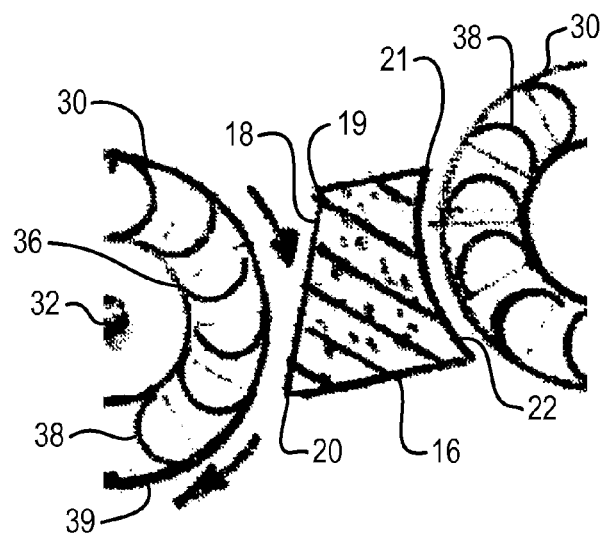
FIG. 3B illustrates a close-up view of a single baffle and its adjacent paddle wheels.

As shown in FIGS. 3A and 3B, each individual paddle 38 preferably is curved, e.g., so that it generally resembles a longitudinal strip of a hollow cylinder, and is concave in the direction of the incoming water current. Such a configuration has been found to increase efficiency.

In addition, each of the concrete baffles 16 (one located between each pair of adjacent paddle wheels 30) preferably has an angled (typically flat) front face 18 (i.e., the face that is adjacent the rear portion of the paddle wheel 30 immediately in front of it), such that the top front edge 19 of the baffle 16 is furthest from the waterwheel 30 immediately in front of it, and its bottom front edge 20 is closest to the waterwheel 30 immediately in front of it. This configuration has been found to increase efficiency by directing the incoming wave over and around the paddle wheels 30. The degree to which the front face 18 of the baffle 16 is sloped preferably depends upon the expected current speeds resulting from the waves to be encountered. Also, for increased efficiency, the top surface of each baffle 16 preferably is sloped so that the rear top edge 21 of the baffle 16 preferably is higher than the front top edge 19.

At the same time, the rear face 22 of each baffle 16 (i.e., the face adjacent to the front of the paddle wheel 30 immediately behind it) preferably closely conforms to the paddle wheel 30 immediately behind it, thereby protecting such paddle wheel 30, e.g., from the force of the oncoming wave. In the preferred embodiments, the rear face 22 of the baffle 16 is not used for directing water flow, but rather is solely used for protecting the adjacent paddle wheel 30.

The front deck 45 preferably is angled along its top surface 48 and its bottom surface 49. Thus, similar to the front face 18 of the baffles 16, front deck 45 preferably also guides the incoming wave across the waterwheels 30. Also, similar to the rear face 22 of the baffles 16, the rear face 52 of front deck 45 preferably closely conforms to the paddle wheel 30 immediately behind it (i.e., the first paddle wheel 30), thereby protecting such paddle wheel 30.

In addition, the side walls 14 can help to channel the waves over the paddle wheels 30. It is further noted that the present configuration of the entire main structure 12 (which includes the baffles 16, front deck 45 and side walls 14) also channels the spent wave returning flow under the energy-generating unit 10, in order to collect that energy as well, thereby further increasing efficiency.

Returning to FIG. 1, the energy-generating unit 10 is held in place by cables 72 attached to anchor 70. In the preferred embodiments, anchor 70 is a re-floatable concrete anchor, e.g., of the type described in the '587 application. The anchor 70 preferably also has a hose/cable pair 74 that includes a retrieval cable and an air hose. Hose/cable pair 74 attaches to a deadweight anchor 75 (e.g., ensuring that the hose/cable pair 74 is pulled a safe distance away from the energy-generating unit 10 and anchor 70) and then rises up to a buoy or other flotation device 76 that floats on top of the surf line 80. Such a configuration facilitates re-floating the anchor 70 in order to re-locate the system.

Similarly, side walls 14 preferably encase ballast tanks 25 that allow for the floating and positioning of the energy-generating unit 10 in the water. More preferably, each side wall 14 includes a plurality of separately controllable ballast tanks 25, from front to rear, so that the entire energy-generating unit 10 can be balanced from front to rear, as well as from left to right. Ballast tanks 25 can be supplied with air for re-floating, e.g., through a separate air hose attached to buoy 76 or to a separate buoy (not shown), or through the air hose that is part of hose/cable pair 74 (e.g., using a control system to route the incoming air to the appropriate location within anchor 70 or within the energy-generating unit 10, as desired).

The entire system preferably is deployed with a tug boat, e.g., in the manner described in the '587 application, with the anchor 70 being sunk, the deadweight anchor 75 being dropped, the hose/cable pair 74 being attached to the buoy 76, the energy-generating unit 10 having positive buoyancy and being cabled to the anchor 70 in a direction facing the incoming waves at a position below the surf line 80. However, unlike many of the previously described systems, due to the present system's expected proximity to the shore, some onshore cable-positioning assistance preferably is provided (e.g., using an onshore tractor).

It is contemplated that the entire system occasionally will be repositioned because the beach configuration in most locations is continually changing. However, because the system is mobile in the preferred embodiments, it is capable of being quickly repositioned.

Tidal Water Current Energy System.

Figure 4:
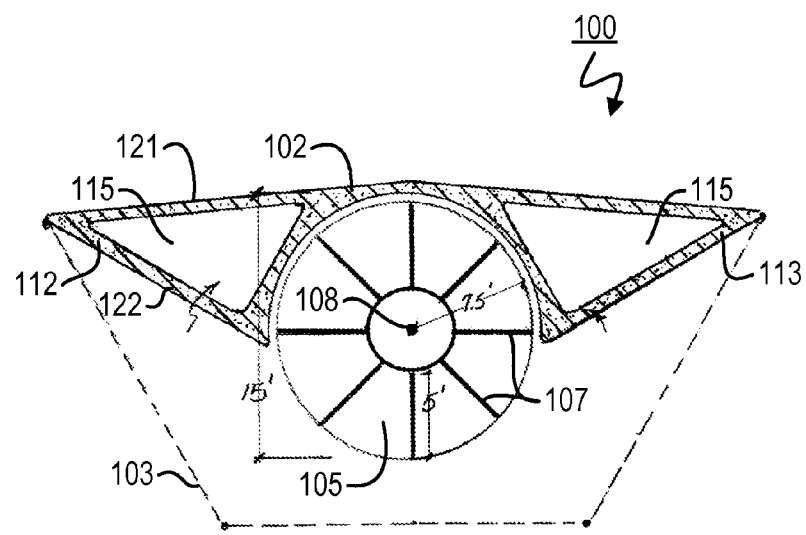
FIG. 4 is a left side center sectional view of a water current energy-generating unit.
Figure 5:
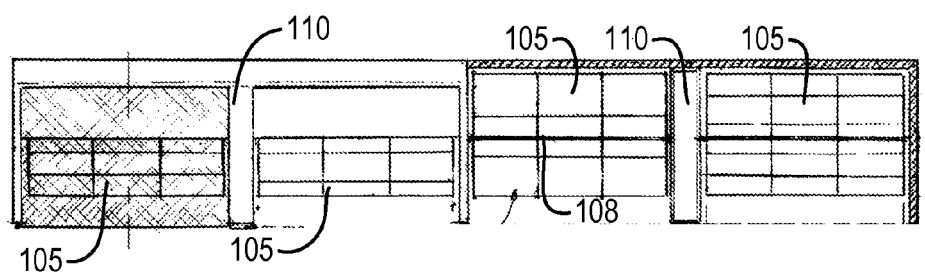
FIG. 5 is a front center sectional view of a water current energy-generating unit.

FIGS. 4 and 5 illustrate an alternate embodiment of an energy-generating unit 100 that can, e.g., be used in place of the energy-generating units described in the '587 application. Other than the changed and additional features described and illustrated herein with respect to energy-generating unit 100, as compared with the energy-generating units described in the '587 application, all other considerations pertaining to the energy-generating units described in the '587 application also apply with respect to energy-generating unit 100. For example, the same construction and deployment techniques described in the '587 application preferably are used for constructing and deploying energy-generating unit 100.

As shown in FIGS. 4 and 5, the energy-generating unit 100 includes a main structure 102 (preferably fabricated primarily or substantially entirely from concrete), a screen 103, a plurality of paddle wheels 105, each having multiple individual paddles 107, and one or more generators 110. In the preferred embodiment, the paddles 107 are substantially planar, or at least without any significant overall curvature from front to rear, so that they are equally capable of being pushed by a current from either direction (front-to-rear or rear-to-front, relative to the energy-generating unit 100).

The main structure 102 includes a front portion 112 and a rear portion 113, each preferably comprising one or more ballast tanks 115 for controlling the overall buoyancy of the energy-generating unit 100, as well as for maintaining its proper orientation. Although only a single ballast tank 115 is visible in the drawings for each of front portion 112 and rear portion 113, multiple ballast tanks 115 can be provided in sequence from left to right within each of front portion 112 and rear portion 113, thereby providing greater ability to more precisely level the energy-generating unit 100.

In the preferred embodiments, as most clearly illustrated in FIG. 4, the front and rear halves of energy-generating unit 100 exhibit mirror symmetry, thereby allowing equally efficient operation irrespective of the direction in which the water current is flowing. Also, both the top surface 121 and the bottom surface 122 of the main structure 102 preferably are angled in order to facilitate the balancing of energy-generating unit 100 within the water current. The degree of slope preferably varies depending on the expected water current speed and the size of the paddle wheel 105. Generally speaking, as the paddle wheel 105 turns the entire energy-generating unit 100 tends to dive. On the other hand, increasing the slope of the bottom surface 102 tends to cause energy-generating unit 100 to rise, and increasing the slope of the top surface 121 tends to cause energy-generating unit 100 to dive. In one particular embodiment, the top surface 121 is sloped approximately one half of the angle at which the bottom surface 122 is sloped, both with reference to the horizontal plane. In another embodiment that employs larger paddle wheels 105, the top surface 121 is angled at approximately 5° and the bottom surface is angled at approximately 30°, again both with reference to the horizontal plane. However, in the preferred embodiments, the top surface 121 is sloped at approximately the same angle at which the bottom surface 122 is sloped, both with reference to the horizontal plane.

Screen 103 (e.g., fabricated from plastic-coated wire) functions as a guard, covering the energy-generating unit 100 in order to protect aquatic life from the paddle wheels 105 and to protect the paddle wheels 105 from floating debris. Although not shown in FIG. 4, supporting structure extending from the main structure 102 to the screen 103 can be used to provide structural support for screen 103.

As shown in FIG. 5, the energy-generating unit 100 preferably includes four side-by-side paddle wheels 105, with a generator unit 110 located between each pair of paddle wheels 105 (for a total of two generator units 110). More preferably, each such pair of paddle wheels 105 is on a common axis 108, so that they move, and turn the generator 110 between them, together. Each generator unit 110 of the present embodiment is a 5,000 volt AC generator, and the energy-generating unit 100 of the present embodiment (having dimensions shown in FIGS. 4 and 5) can, e.g., be placed in a 5 mile per hour (MPH) current (e.g., tidal current).

Energy-generating unit 100 preferably is fairly large, e.g., at least 50, 75 or 100 feet in width (e.g., with each paddle wheel 105 being 24 feet long), at least 20-40 feet from front to rear, and at least 10-20 feet deep. In the presently illustrated embodiment, the paddle wheels 105 have a diameter of approximately 15 feet.

River Current Energy System.

Figure 6:
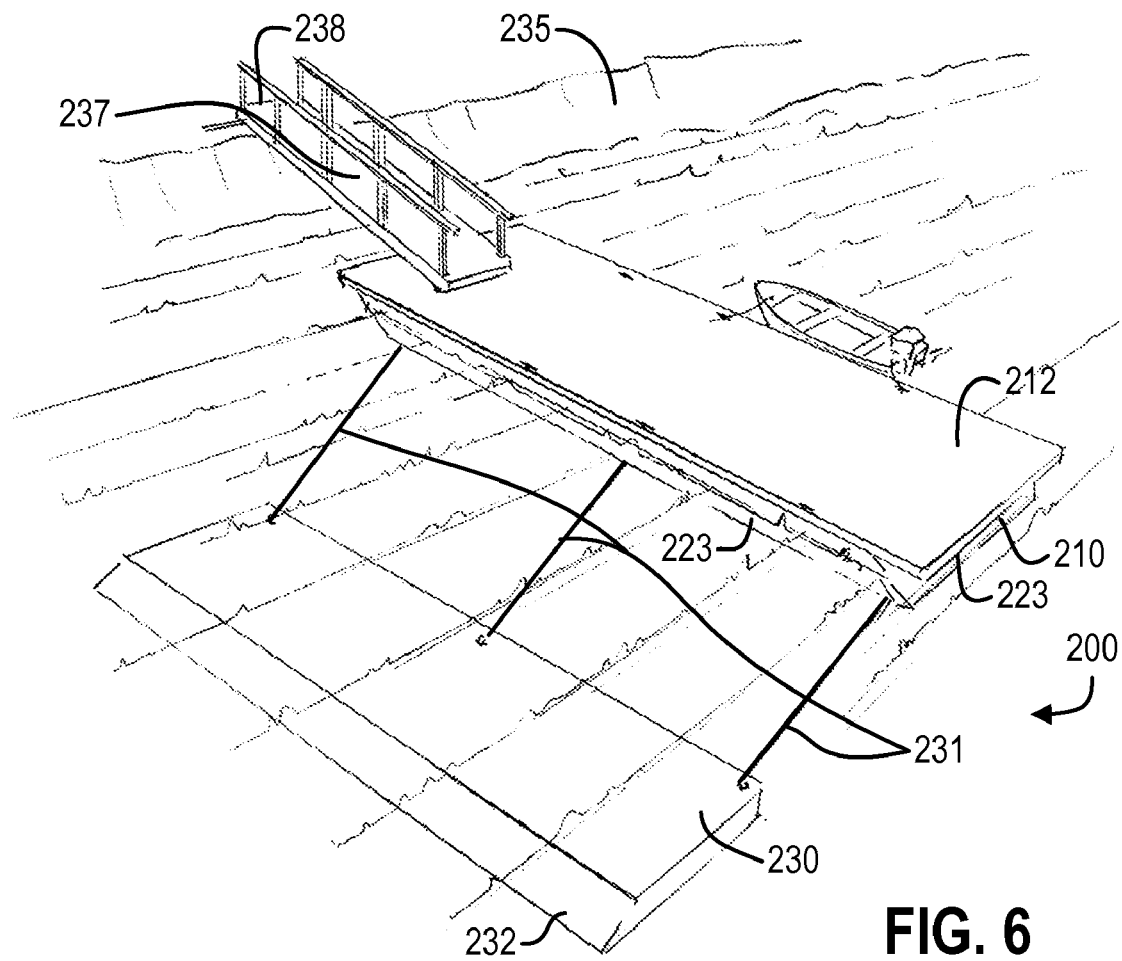
FIG. 6 is a perspective view of a system that includes a structure functioning as both a floating dock and a water current energy-generating unit.
Figure 7:
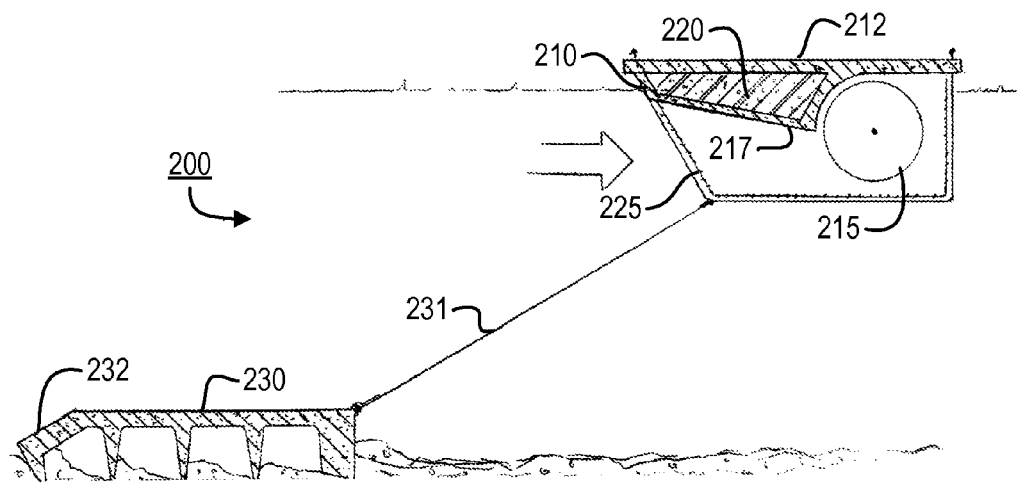
FIG. 7 is a front center sectional view of a system that includes a structure functioning as both a floating dock and a water current energy-generating unit.

FIGS. 6 and 7 illustrate a system 200 that includes a structure 210 functioning as both a floating dock and a water current energy-generating unit. Specifically, the top surface of structure 210 can be used as a dock 212, while one or more paddle wheels 215 and corresponding generator(s) (not shown, but preferably of the same type of underwater energy-generating unit discussed above) are disposed on the bottom side of structure 210.

In the present embodiment, a single long paddle wheel 215 or, more preferably, two or four side-by-side paddle wheels 215 (e.g., as discussed above) are disposed along the length of structure 210. In addition, a front deck 217 slopes downwardly from the bottom edge of the dock 212 and directs the flow of the water current across the paddle wheel(s) 215. In addition, front deck 217 preferably houses an enclosure 220 that holds plastic foam or other buoyant material, so as to provide adequate positive flotation. Alternatively, in certain embodiments enclosure 220 houses a ballast tank that is used to control the proper amount of flotation for structure 210. Although not shown in the attached drawings, a similar buoyant enclosure also may be provided along the rear edge of structure 210. On the other hand, the paddle wheel(s) 215 typically will provide a certain amount of buoyancy to the structure 210, so that in certain embodiments such a separate rear enclosure would be superfluous.

The main portion of structure 210, including dock 212 and front deck 217 (functioning as a baffle), preferably is fabricated primarily, or substantially entirely, of concrete. In addition, the concrete main portion of structure 210 includes side walls 223 that support the paddle wheel(s) and generator(s). In addition, guard screen 225 covers paddle wheel(s) 215 in order to protect aquatic life from the paddle wheel(s) 215 and to protect the paddle wheel(s) 215 from floating debris.

As shown, structure 210 preferably is held in place by being attached to a re-floatable concrete anchor 230 using cables 231. In the preferred embodiments, cables 231 are attached to the side walls 223 and to a center wall (not shown) that is parallel to side walls 223. However, in alternate embodiments, cables 231 instead (or in addition) may be attached to other concrete surfaces of structure 210, such as front deck 217.

The front (upstream) edge 232 of anchor 230 preferably is plow-shaped, with the concave face directed downstream, thereby providing the anchor 230 with increased holding power in the river current by resisting motion in the downstream direction. In addition, structure 210 can be attached to the riverbank 235 using cables (not shown) and/or, in situations where the water level of the river is expected to change significantly, ramp 237 can be pivotally attached to riverbank 235 at its proximal end 238 to accommodate corresponding changes in the position of ramp 237. As a still further alternative, structure 210 can be held fixedly in place (rather than, or in addition to, being tethered to anchor 230), e.g., using pilings.

The same structure 210 could be expanded and modified in certain respects to form a pontoon bridge that would extend all the way across the river. In this embodiment, the bridge preferably would have a movable center section (e.g., without paddle wheels or generators) in order to allow boats to pass through, and the bridge itself preferably would be anchored on both the upstream and downstream sides, e.g., by using an anchor 230 on each side of the bridge, attached to the bridge using cables 231.

Figure 8:
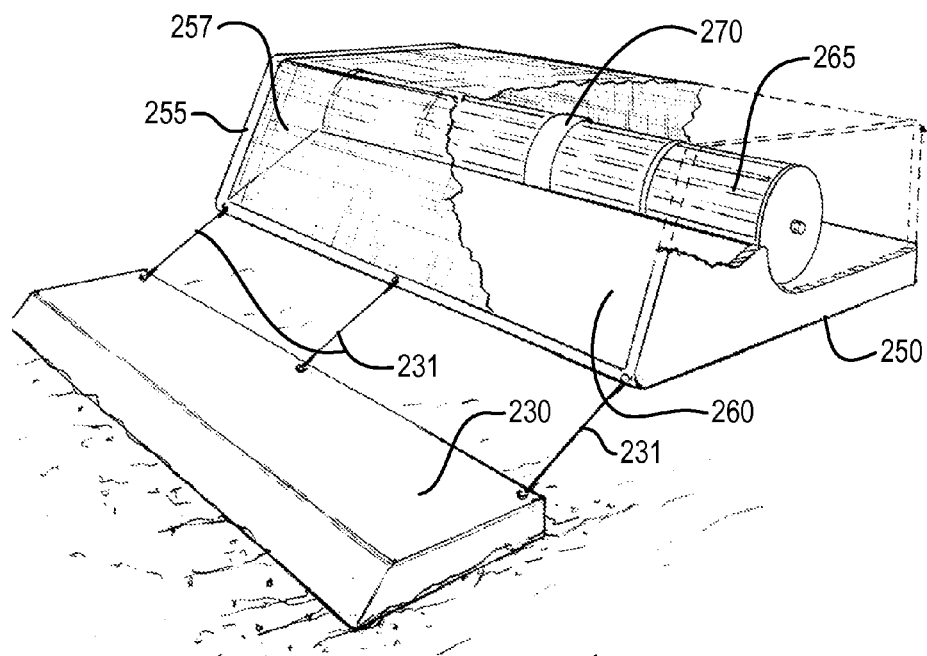
FIG. 8 is a perspective, partially cutaway view of a subsurface energy-generating system that is particularly adapted for use in a stream or river.
Figure 9:
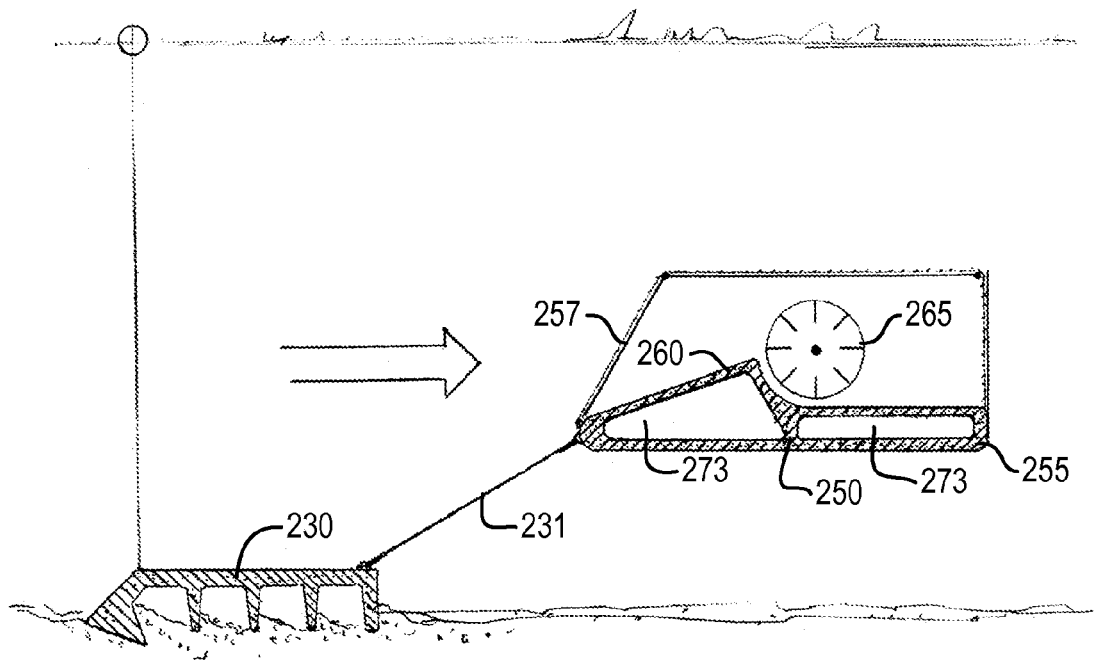
FIG. 9 is a left side center sectional view of a subsurface energy-generating system that is particularly adapted for use in a stream or river.

FIGS. 8 and 9 illustrate an embodiment similar to the dock embodiment discussed above. Here, however, rather than the energy-generating unit providing a surface that extends above the water's surface, the entire energy-generating unit 250, while still buoyant, is submerged beneath the water's surface. As with the previously described dock embodiment, the present embodiment also is particularly suited for use in a stream or river, but also can be used in other environments.

It is noted that the present embodiment could be completely identical to the previous embodiment by just using shorter anchor cables 231 (e.g., shorter fixed cables or winching to a shorter length). However, energy-generating unit 250 instead can (but need not) be inverted when compared to structure 210. In either case, anchor cables 231 preferably are kept sufficiently short so that the structure 250 is held below the surface water traffic and out of sight.

Structure 250 preferably includes a housing 255 that is fabricated primarily, or substantially entirely, of concrete and includes a supporting guard screen 257 and a front deck 260 to direct the water flow over the paddle wheels 265, but in this embodiment front deck 260 slopes upwardly from its front to its rear end, and the paddle wheels 265 are attached to the bottom of housing 255 rather than its top. Between the paddle wheels 265 is a watertight electrical generator 270. It is noted that the same paddle wheel and generator assembly used in the dock embodiment described above preferably are used in this embodiment as well.

The structure 250 preferably is held place by a re-floatable anchor 230 (i.e., preferably having the same structural features as are used for the floating dock system described above) using cables 231. As shown, cables 231 preferably attach to the upstream bottom edge of structure 250 (i.e., the front edge of concrete deck 260).

As shown in FIG. 9, flotation ballast tanks or other enclosures 273 holding buoyant material preferably are provided within the wedge formed by the sloping front deck 260 and within the space beneath the paddle wheel 265 extending to the rear of the housing 255.

Although the paddles for paddle wheels 215 and 265 are shown in the drawings as being substantially flat and planar, in certain embodiments they are curved, with the concave side facing the current flow directed by the front deck 217 or 260, respectively.

Deep Ocean Current Energy System.

Figure 10:
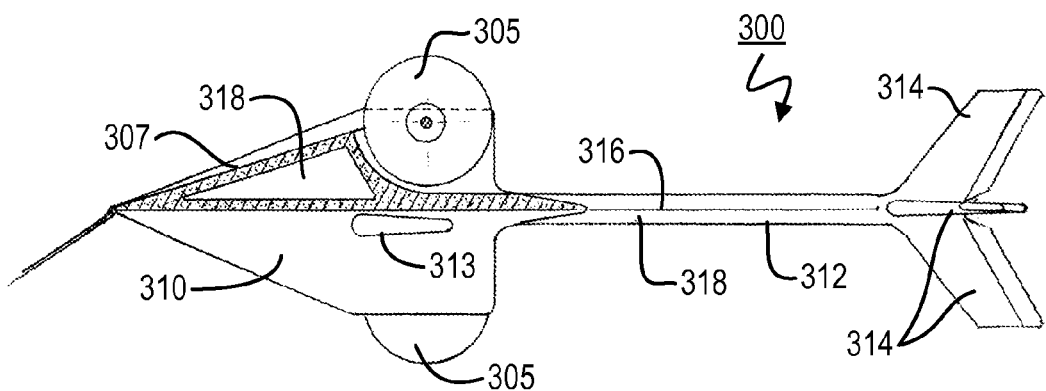
FIG. 10 is a left side center sectional view of an energy-generating unit that is particularly adapted for use in deep ocean currents.
Figure 11:
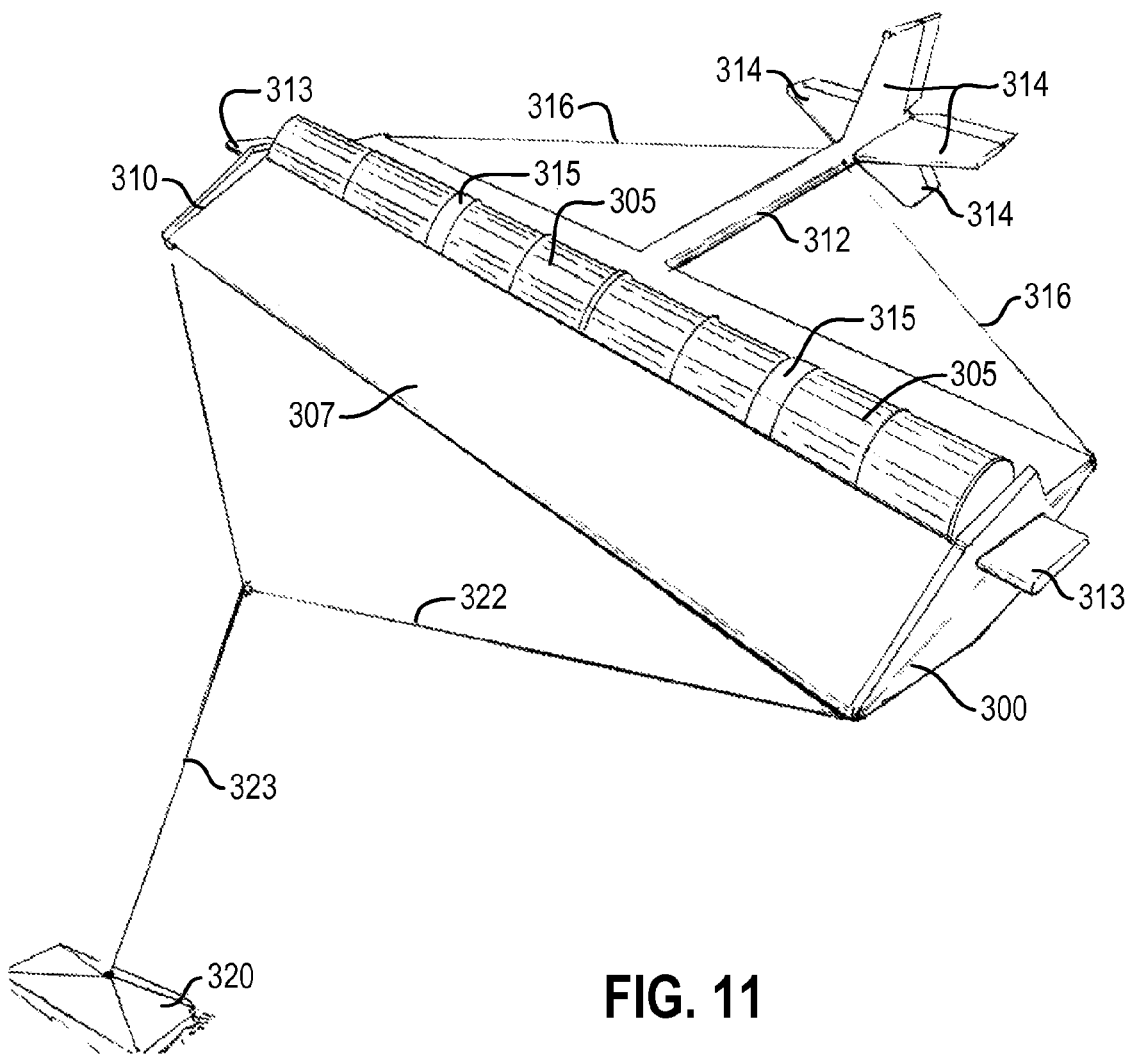
FIG. 11 is a top front perspective view of an energy-generating unit that is particularly adapted for use in deep ocean currents.

FIGS. 10 and 11 illustrate a large sub-surface ocean current energy-generating unit 300. As with the other water current energy-generating units described herein, it is scalable. However, for maximum efficiency, the width of energy-generating unit 300 (and, more specifically, the combined width of water wheels 305) preferably is over 100, 150 or 200 feet. The system (including energy-generating unit 300, anchor 320 and other components described below) preferably is placed off shore in deep water in a major ocean current flow.

The main housing 310 of energy-generating unit 300 preferably is fabricated primarily, or substantially entirely, from concrete and includes a sloping front deck 307 that directs the water current flow over the paddle wheels 305. The lower front half of the main housing 310 is a mirror image of the top section. The energy-generating unit 300 preferably is floated and balanced through the use of ballast tanks 318 located in the main housing 310 and in the tail section 312. In certain embodiments, the orientation of the energy-generating unit 300 is automatically monitored, e.g., through the use of gravity and/or current-flow sensors, and then automatically controlled using side control surfaces 313 located on the main housing 310 (preferably, one on each side) and tail control fins 314 (preferably, four total), e.g., so as to control the energy-generating unit 300 to face directly into the oncoming water current. In any event, the control surfaces 313 and 314 preferably are configured such that energy-generating unit 300 passively orients itself so as to directly face the oncoming water current, so that very little, if any, active control is employed.

The tail section 312 and control fins 314 preferably are fabricated from lightweight, strong, non-corrosive composite plastic material. The tail section 312 preferably is further supported by cables 316 extending to the side edges of main housing 310.

As shown in FIG. 11, energy-generating unit 300 preferably includes two sets of four paddle wheels 305 (for a total of eight paddle wheels 305), with a generator 315 disposed between the second and third paddle wheels 305 in each such set. As noted above and shown in FIG. 10, the bottom portion of main housing 310 preferably is a mirrored arrangement of the top, having an additional eight paddle wheels 305 and two generators 315. The system is connected to the anchor 320 (preferably a re-floatable concrete anchor) by a cable harness 322 attached to a single anchoring cable 323. This arrangement allows the energy-generating unit 300 to move with the ocean current as it shifts directions.

Figure 12:
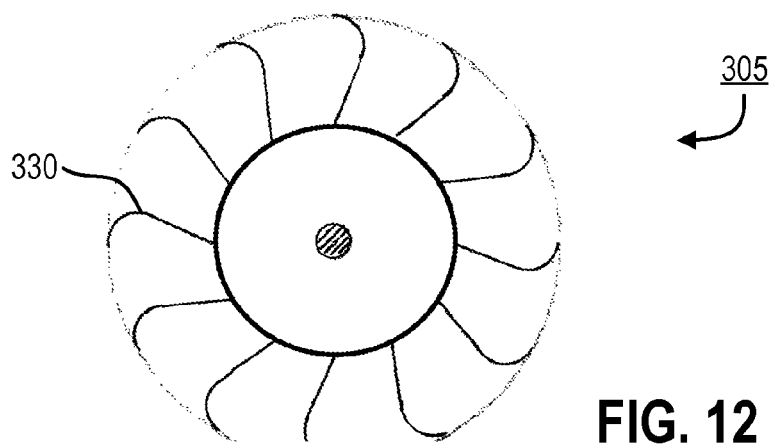
FIG. 12 is a left side center sectional view of the paddle wheel for an energy-generating unit that is particularly adapted for use in deep ocean currents.

As shown in FIG. 12, the paddles 330 of paddle wheel 305 preferably have a hook-shaped cross-section, i.e., curved at their distal ends and substantially planar at their proximal ends, with the curve having a concave face in the direction of the incoming water current. Depending upon a number of factors (such as current speed, size of unit, etc.) the number of paddles, their shape, and paddlewheel size preferably are modified, i.e., to optimize the system performance for a given water current environment.

Figure 13:
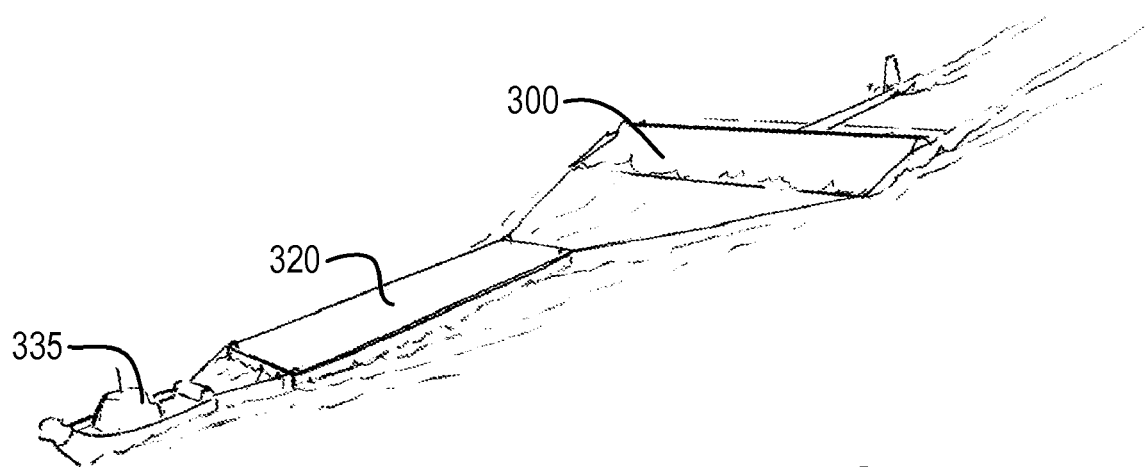
FIG. 13 is a perspective view illustrating the towing of an energy-generating unit and corresponding anchor to an intended use site.
Figure 14:
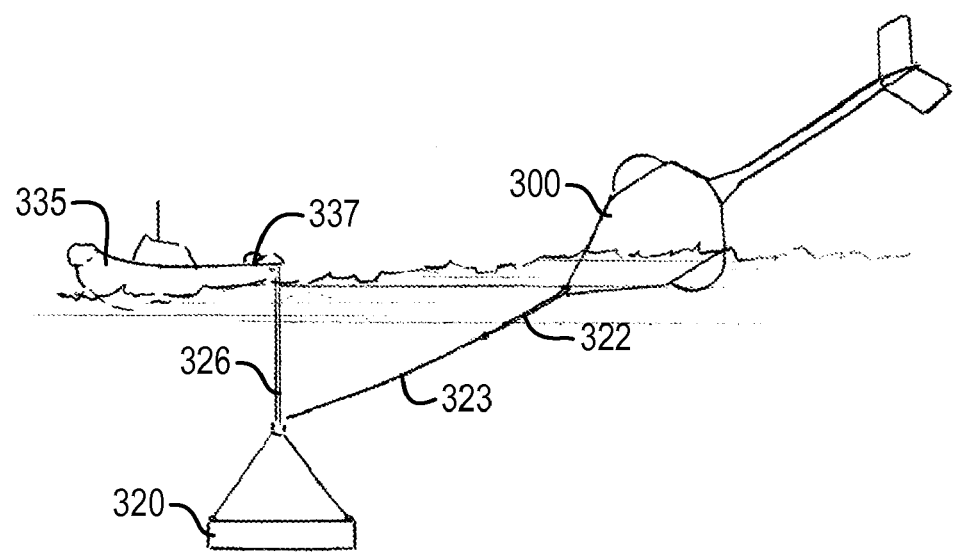
FIG. 14 is a left side elevational view illustrating deployment of an energy-generating unit and corresponding anchor.

FIGS. 13-16 illustrate an example of how the foregoing energy-generating system preferably can be transported, deployed and maintained, as well as how the energy that it produces can be converted to a gas that is stored and transported. As shown in FIG. 13, a tugboat 335 tows both anchor 320 and energy-generating unit 300. As shown in FIG. 14, after the cabling is rearranged, air is released from the anchor 320. As anchor 320 slowly sinks, it is guided by cables attached to winches 337 on the tugboat 335. When the anchor settles at the predetermined operational site, air is released from the energy-generating unit ballast tanks 318. At the same time, the energy-generating unit 300 is pulled down by the anchoring cables 322, 323 to the approximate operational depth. Air is then pumped back into the energy-generating unit ballast tanks 318 creating a positive floatation to stabilize and balance the energy-generating unit 300 in a sub-surface buoyant position. One or more winches may be provided on the energy-generating unit 300 and/or on the anchor 324 for the purpose of adjusting the depth of energy-generating unit 300 over time, after the initial deployment. Alternatively, or in addition, a winch can be provided on the deployment tugboat 335 and/or on a maintenance tugboat 370 for adjusting the cables at deployment and/or after deployment, again for the purpose of adjusting the depth of energy-generating unit 300.

Figure 15:
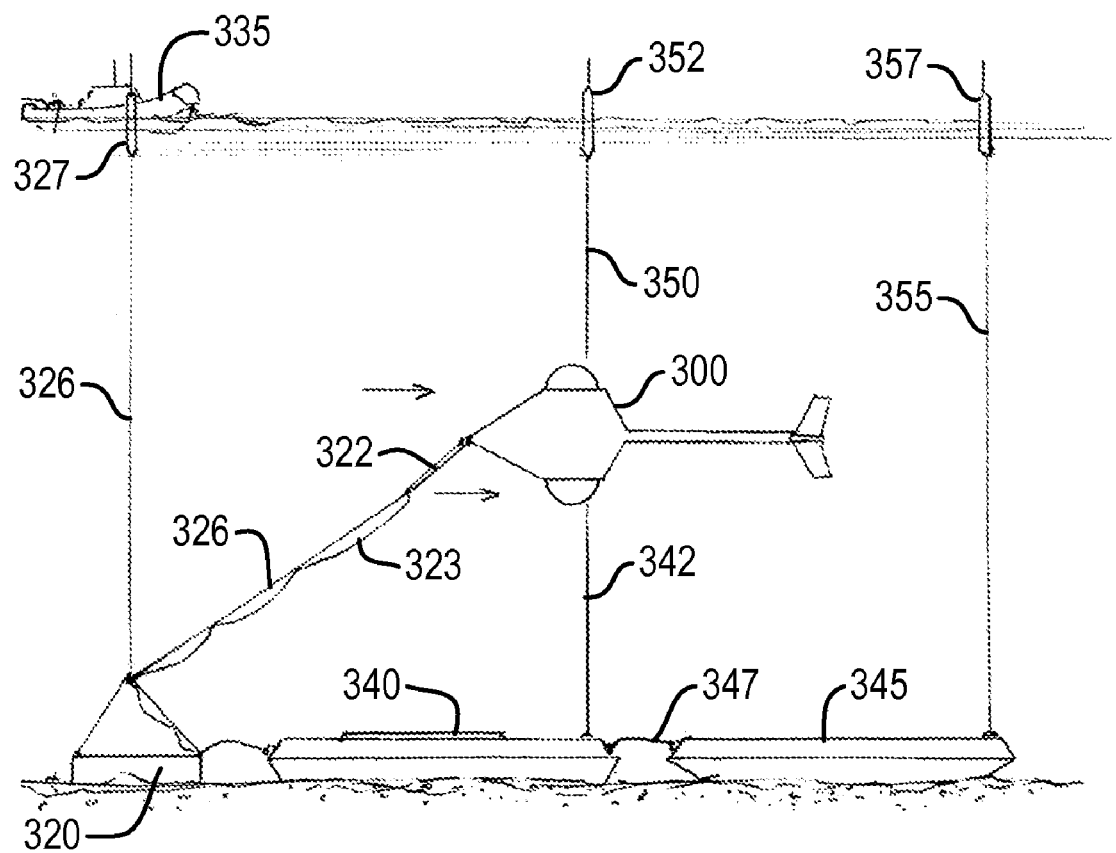
FIG. 15 is a left side elevational view illustrating a fully deployed energy-generating system that is particularly adapted for use in deep ocean currents.

FIG. 15 shows the energy-generating unit 300 at an operational depth, held in place by anchor cables 322, 323 and facing the oncoming ocean current. The electrical energy produced by energy-generating unit 300 preferably is used to generate hydrogen gas from the ambient sea water, e.g., in a re-floatable hydrogen-generation barge 340 with an electrical line 342 carrying the generated electrical power to barge 340. Such hydrogen preferably is then transferred to a re-floatable sub-surface transport barge 345 for later delivery using a gas hose 347. It is noted that both the hydrogen-generation barge 340 and transport/storage barge 345 also may have been towed to the use site by tugboat 335. A retrieval cable 326 preferably runs from the anchor 320 to a surface transceiver buoy 327, which receives and transmits system operational information. After the system has been fully deployed, as shown in FIG. 15, tugboat 335 can depart.

In the present embodiment, and air hose 350 connects energy-generating unit 300 to a surface buoy 352 for the purpose of re-floating energy-generating unit 300 when desired. In addition, one or more hoses 355 connect transport/storage barge 345 to a surface buoy 357 for the purpose of re-floating barge 345 and/or offloading hydrogen produced by barge 345. It is further noted that communication lines also can connect the various system components to their respective buoys 327, 352 and/or 357, e.g., so that sensor information from such system components can be read by the deployment tugboat 335 and/or a service (or maintenance) tugboat 370.

Figure 16:
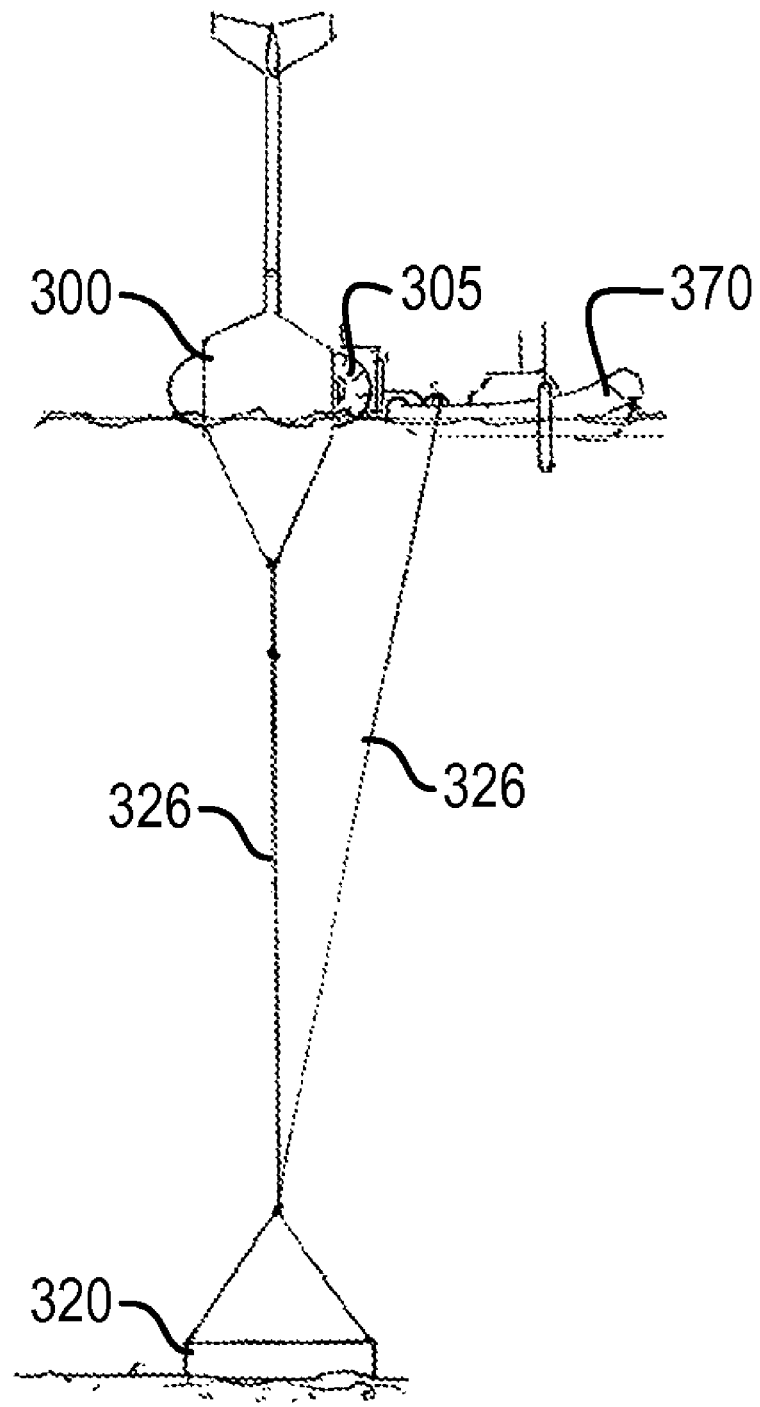
FIG. 16 is a left side elevational view illustrating an energy-generating unit that has been refloated so that it floats at the surface in a vertical orientation, which is the preferred orientation for maintenance purposes.

As shown in FIG. 16, when the system is desired to be re-floated for maintenance or relocation, a service tug 370 retrieves cable 326 and pumps air into the desired components of the submerged system, here, energy-generating unit 300, raising the energy-generating unit 300 to a vertical maintenance mode, as shown. The paddle wheels 305 and attached generators 315 preferably are configured such that they can easily be removed from the energy-generating unit 300 above water and replaced or taken ashore for repair. More preferably, the entire system is configured such that maintenance or replacement of any operational component can be accomplished quickly and simply above water.

Production Casting Platform.

Figure 17:
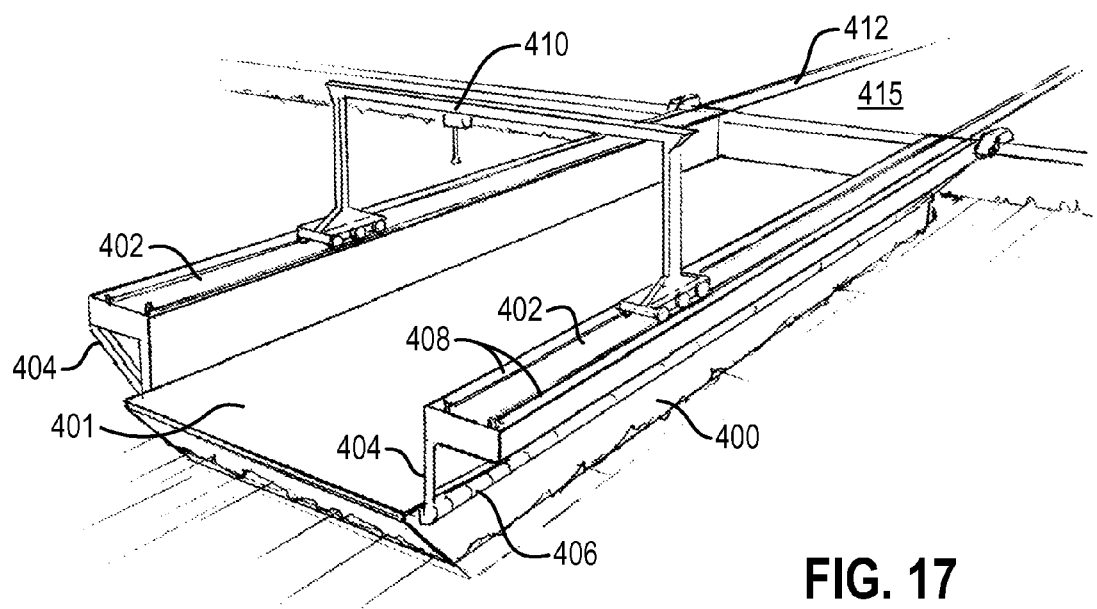
FIG. 17 is a top front perspective view of a steel submersible casting platform barge.
Figure 18:
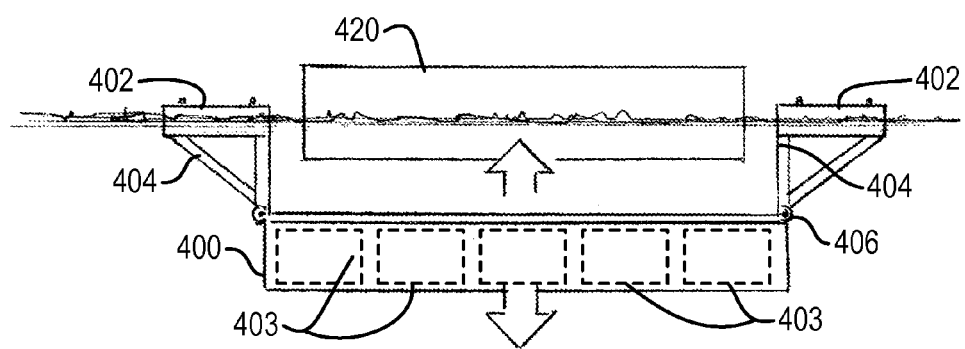
FIG. 18 is a front elevational view of a steel submersible casting platform barge and a component manufactured on it, with the casting platform barge partially submerged, so that the manufactured component is able to float free of the barge.

FIGS. 17 and 18 illustrate a steel submersible casting platform barge 400. In the preferred embodiments, barge 400 includes numerous below-deck waterproof compartments 403 (e.g., arranged in a grid) and is provided with pumps and valves to selectively flood or pump out individual ones of such compartments 403. In addition, barge 400 preferably is provided with two or more positive flotation tanks 402 that extend on steel truss supports 404 above the barge deck 401. Supports 404 preferably are hinged 406 to the barge deck 401 and can be locked into an upright position, as shown in FIGS. 17 and 18. Rail tracks or traceways 408 are attached to the top sides of tanks 402, in order to guide and support a gantry-type crane 410, with the structure for crane 410 including wheels for rolling along the top surface of tanks 402.

The crane 410 is used to lift and move equipment and material on and off the barge deck 401. For example, one of the main purposes of barge 400 preferably is for fabricating large concrete castings (e.g., castings having a maximum dimension of more than 50, 75 or 100 feet, meaning that barge 400 preferably is even larger than such anticipated maximum dimensions). For this purpose, crane 410 preferably is used, e.g.: to bring in concrete forms and prefabricated components to be embedded within the concrete castings (such as ballast tanks); to pick up a concrete hose and pour concrete from it into the forms; and to bring in and place other components to be attached after the concrete castings have cured (such as generators and paddle wheels).

As shown in FIG. 18, once a finished concrete casting (or other structure) 420 has been at least partially constructed on deck 401, crane 410 is backed off of barge 400. For this purpose, the top surface of tanks 402 preferably is flush with a surface 412 on dock 415. Then, barge 400 is partially submerged by flooding the below-deck compartments 403. However, tanks 402 preferably remain buoyant, preventing barge 400 from sinking more than is necessary. At the same time, the structure 420 that is being fabricated preferably remains buoyant so that the partial submersion of barge 400 results in structure 420 floating free from barge 400, as shown in FIG. 18.

As noted above, in the preferred embodiments barge 400 is used primarily to fabricate structures 420 that are made primarily or substantially entirely of concrete, such as the anchors and/or the housings for any of the energy-generating units described herein or in any of the patent documents incorporated herein by reference. The poured concrete preferably is permitted to fully cure in the water. The completed structure 420 then is towed away, barge 400 is refloated, crane 410 is wheeled back onto barge 400, and another structure 420 is fabricated on deck 401. If additional components are to be attached to the structure 420 after the concrete has cured, then it often will be desirable to (1) release the structure 420 in a partially completed state, as described above, so that it floats freely, allowing the concrete to cure in the water; (2) re-float barge 400 underneath structure 420 so that structure 420 is again supported entirely by barge 400; (3) attach the additional components to the completely cured concrete casting 420; (4) repeat the process of partially submerging barge 400 so that structure 420 floats freely; and then (5) tow the completed structure 420 away.

Figure 19:
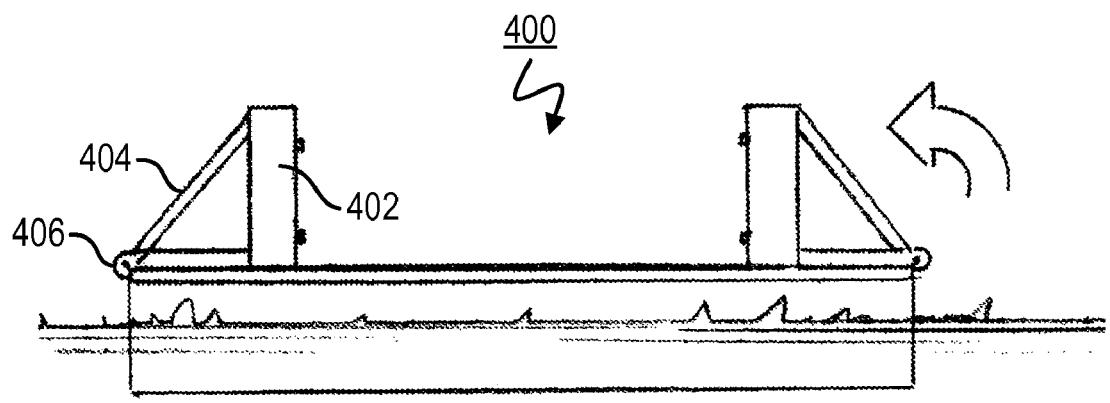
FIG. 19 is a front elevational view of a steel submersible casting platform barge under tow.

When desired, barge 400 can be towed to a different location. FIG. 19 shows the barge 400 floating under tow, with the positive floatation tanks 402 unlocked, hinged down, and locked to the deck 401.

Energy-Generating System Using Fixed-Position Fabric or Fabric-Like Paddles.

Figure 20:
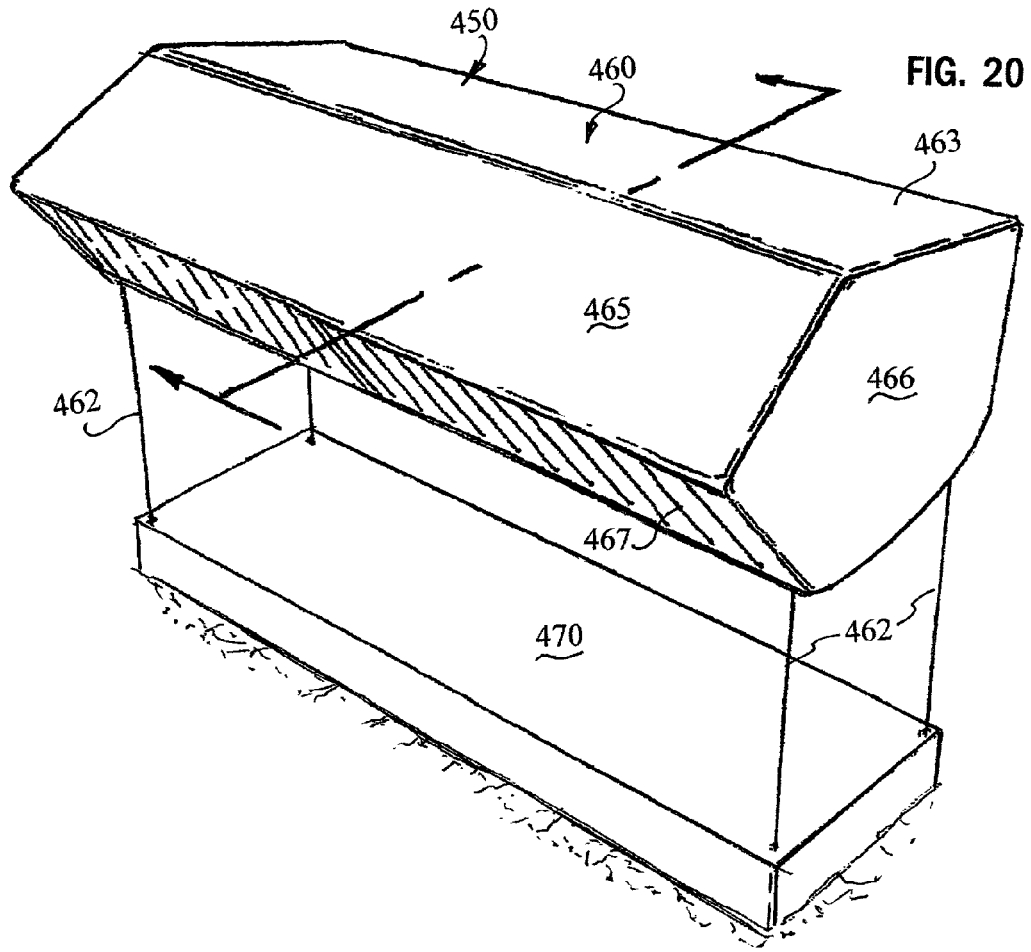
FIG. 20 is a perspective view of an energy-generating system according to a representative embodiment of the present invention.

FIG. 20 is a perspective view of an energy-generating system 450 according to a representative embodiment of the present invention. As shown, system 450 includes an energy-generating unit 460 which is attached (e.g., via cables 462) to an anchor 470. In the preferred embodiments, both energy-generating unit 460 and anchor 470 are refloatable (e.g., having variable buoyancy from negative to positive) and have a main structure that is primarily made of concrete (e.g., as described in the '219 patent).

As shown, energy-generating unit 460 has an overall configuration that is similar to energy-generating unit 100. Like energy-generating unit 100, energy-generating unit 460 has a covering structure 463 with a sloped upper surface 465. Sidewalls 466 are provided at the left and right ends of energy-generating unit 460, and a screen 467 protects large aquatic life from being swept into the paddlewheel, as well as protecting energy-generating unit 460 from floating debris. In this regard, energy-generating unit 460 uses at least one paddlewheel to convert water current into usable kinetic energy that can then be used, e.g., to generate electricity and then to produce hydrogen from surrounding water. However, in the present embodiment, as discussed in more detail below, at least one of the paddlewheels uses individual paddles made from a sheet of fabric or fabric-like material (e.g., a pliable and/or supple material).

Figure 21:
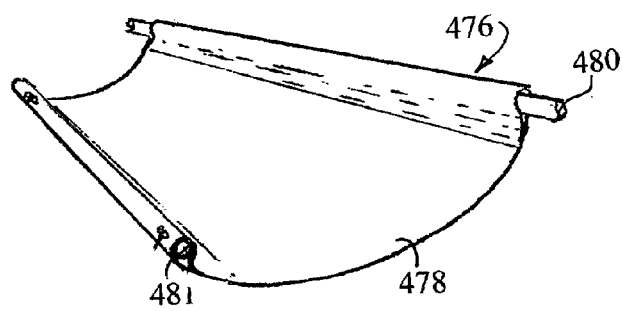
FIG. 21 is a perspective view showing the structure of a paddle made primarily of a sheet of fabric or fabric-like material according to a representative embodiment of the present invention.

FIG. 21 illustrates the general concept behind the construction of a paddle 476 according to the preferred embodiments of the present invention. As shown, paddle 476 primarily is comprised of a sheet 478 of fabric or fabric-like material attached to, or suspended between, two elongated members 480 and 481. For this purpose, the edges of sheet 478 preferably are looped around the corresponding elongated members 480 and 481 (preferably, rods) and then the portions where the material of sheet 478 overlaps itself are stitched (e.g., in the manner that a curtain often is attached to a curtain rod). However, such overlapping portions instead may be joined together through the use of adhesive material, rivets or any other attachment devices or means. Similarly, sheet 478 may be attached to elongated members 480 and 481 using other devices, such as rings (e.g., in the manner of attaching a shower curtain to a shower-curtain rod). In any event, the edges of sheet 478 preferably are not fixed relative to elongated members 480 and 481, but instead are capable of rotating or pivoting around elongated members 480 and 481. In the preferred embodiments, sheet 478 is made of a composite material that is strong, pliable and/or supple, waterproof (or water-resistant), and substantially inelastic. More preferably, sheet 478 is made of sailcloth or a sailcloth-like material, such as Kevlar™

Figure 22:
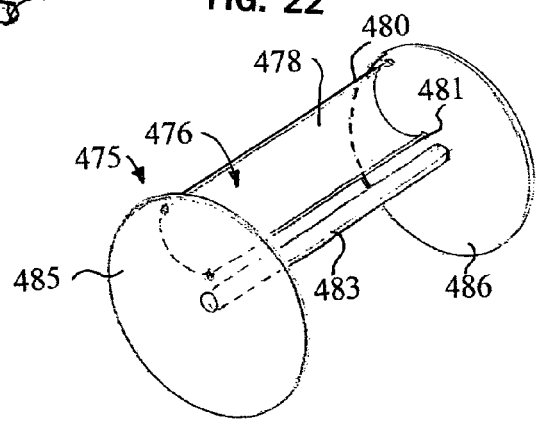
FIG. 22 is a perspective view of a portion of a paddlewheel having paddles made primarily of a sheet of fabric or fabric-like material according to a representative embodiment of the present invention.

FIG. 22 illustrates a portion of a paddlewheel 475 which can be used within energy-generating unit 460. In the present embodiment, paddlewheel 475 includes a number of paddles (although for ease of illustration only a single paddle 476 is shown in FIG. 22), with at least one of the paddles 476 (and preferably all of the paddles) having a main surface area of fabric or fabric-like material, a central axle 483 (which corresponds to the axis of rotation for paddlewheel 475), and end structures 485 and 486 (circular or disc-shaped in the present embodiment).

In the present embodiment, the paddles 476 are fixedly attached to the end structures 485 and 486. More preferably, one elongated member 480 is fixedly attached near the perimeter of each of end structures 485 and 486, and the other elongated member 481 is fixedly attached to the end structures 485 and 486 at points closer to the axle (or axis of rotation) 483 of paddlewheel 475, such that both of elongated members 480 and 481, together with and axis of rotation 483, lie at least approximately in the same plane. As a result, the paddle 476 preferably extends outwardly and radially away from the paddlewheel's axis of rotation 483. Preferably, all or substantially all of the paddles for paddlewheel 475 are configured in this manner and are disposed at uniform angular intervals around axis of rotation 483 (e.g., four paddles 476 at 90° intervals).

Sheet 478 preferably is loosely suspended between the elongated members (e.g., rods) 480 and 481, meaning that sheet 478 has a significant amount of slack, allowing it to form into different shapes. At the same time, as noted above, the edges of sheet 478 preferably can rotate to some extent around the corresponding elongated members 480 and 481, further facilitating the ability of sheet 478 to form into different shapes.

Figure 23:
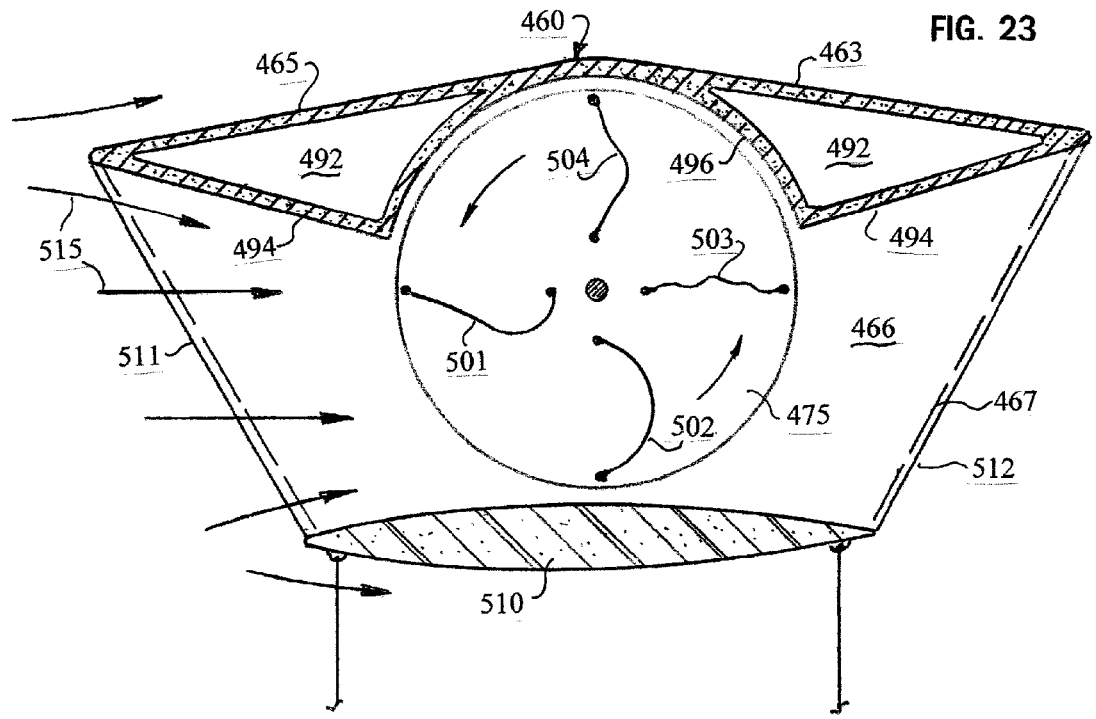
FIG. 23 is an in-use side sectional view of an energy-generating unit using fixed-position fabric or fabric-like paddles, with the water current flowing from front to rear.

FIG. 23 illustrates energy-generating unit 460, and particularly paddlewheel 475, in use. Similar to energy-generating unit 100, energy-generating unit 460 has a covering structure 463 that covers just the top portion of paddlewheel 475, is V-shaped at its front and rear (i.e., tapering as it extends further away in front of and behind paddlewheel 475), preferably is formed primarily (or substantially entirely) from concrete, and includes ballast tanks 492 in its front and rear portions for controlling the overall buoyancy of energy-generating unit 460 and/or for providing front-to-rear (and, if a series of multiple such ballast tanks 492 are provided along the lengths of such front and rear portions, also for providing left-to-right) leveling capabilities. Also similar to energy-generating unit 100, energy-generating unit 460 has a sloped lower surface 494 that funnels the water (e.g., tidal) current 495 during the desired portion (in the present example, the bottom half) of the paddlewheel 475. The upper surface 465 of covering structure 463 preferably is of the same (or at least approximately the same) angular slope as the lower surface 494, which will tend to balance the energy-generating unit 460 in the water current. Preferably, the portion 496 of the lower surface 494 that is immediately above the paddlewheel 475 is arc-shaped (or, more precisely, in the shape of a longitudinal slice of a hollow cylinder) and closely conforms to the outer perimeter of the paddlewheel 475 (e.g., the outer reach of the individual paddles 501-504). As a result of this structure, the current flow tends to move across the paddlewheel 475, with a smaller amount circulating back through.

A lower positive floatation plane 510 that is attached to the sidewalls 466 also directs the current flow to the paddlewheel 475 and balances the energy-generating unit 460. The front opening 511 and the rear opening 512 to the paddlewheel 475 are covered by screen 467.

In the present embodiment, paddlewheel 475 includes four identical paddles 501-504, each extending radially from the axis of rotation 485 and separated from the adjacent paddles by a uniform angular interval (i.e., an angular distance of) 90°, and each preferably having the same structure as paddle 476 described above. Because the sheets 478 are loosely attached to their corresponding elongated members 480 and 481, they naturally form into an appropriate shape to achieve better hydrodynamic efficiencies, e.g., to capture the maximum power of the in-and-out flow of an incoming tidal water current 515 and to reduce their resistance to the water flow when appropriate to do so.

For example, in FIG. 23 paddle 502 is maximally concave because the current flow 515 at the illustrated location of paddle 502 is perpendicular to the plane formed by the two elongated members 483 and 484, while paddles 501 and 503 are largely flat because the current flow at the illustrated locations of paddles 501 and 503 is largely parallel to the plane formed by the two elongated members 480 and 481, and paddle 504 has a curved shape due to the opposing forces of the incoming current flow 515, on the one hand, and the flow induced by the rotation of paddlewheel 475, on the other.

Figure 24:
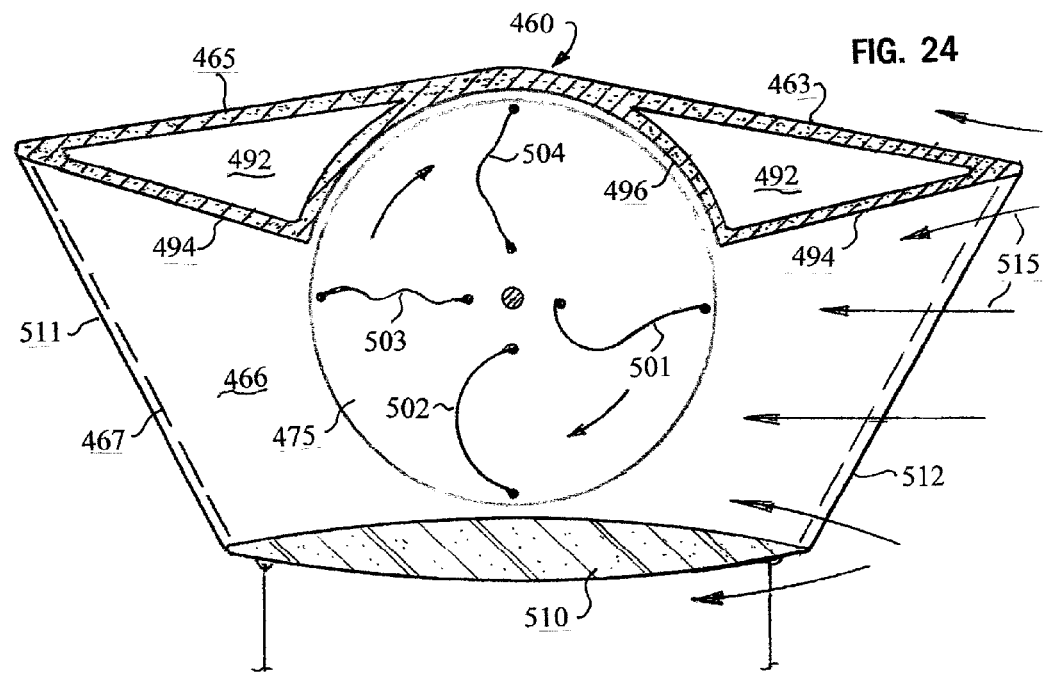
FIG. 24 is an in-use side sectional view of an energy-generating unit having fixed-position fabric or fabric-like paddles, with the water current flowing from rear to front.

It is noted that this structure also permits the overall paddlewheel 475 to be equally efficient irrespective of whether the current is flowing from front to rear (as shown in FIG. 23) or from rear to front (as shown in FIG. 24).

System 450 preferably is used as a tidal current energy-generation system (although it could be used within other environments as well). Tidal flow typically has a sweet spot where the speed and force of the water is the strongest, generally a broad but relatively shallow location that tends to move about over time. The present system 450 is cost-effective and mobile, in that it can be quickly deployed or recovered to adapt to the changing tidal environment.

Energy-Generating System Using Swinging or Pivoting Paddles.

The present inventor has discovered that a problem when attempting to produce power with a submerged paddlewheel is the resistance of each paddle as it turns against the water during that portion of its rotation when it is moving in the opposite direction of the current flow (e.g., with respect to FIG. 23, when the paddle is in the top portion of its rotation). This problem can be reduced somewhat by providing shielding, e.g., through the use of a covering structure such as has been described in the preceding embodiments, which directs the current flow toward the bottom half (or in some embodiments, the top half) of the paddlewheel.

However, even so, some amount of current flow often pushes the paddles (when in this position) in the opposite direction or, at the very least, the paddles (when in this position) still present a certain amount of drag or resistance to the desired rotation of the paddlewheel. The following embodiments address this problem.

Figure 25:
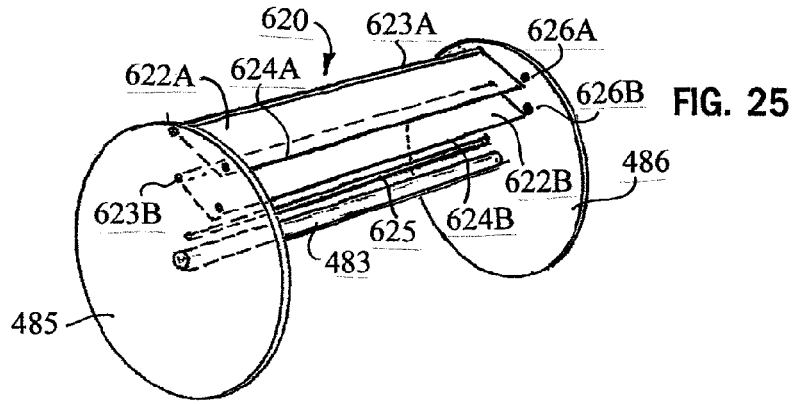
FIG. 25 is a perspective view of a portion of a paddlewheel having swinging or pivoting two-part rigid paddles according to a representative embodiment of the present invention.

FIG. 25 is a perspective view of a portion of a paddlewheel 620 having a basic structure that is similar to that of paddlewheel 475 (shown in FIG. 22), but having swinging or pivoting two-part rigid paddles. In FIG. 25, for ease of illustration, just a single paddle 622 (comprised of parts 622A and 622B) is shown. Each of parts 622A and 622B includes a rod 623A and 623B, respectively, that is pivotally attached (e.g., hinged) to end structures 485 and 486 and an edge 624A and 624B, respectively, that is unattached. As a result, each of parts 622A and 622B is able to pivot or rotate about axis 623A or 623B, respectively. However, rod 623B serves as a stop for part 622A, and a separate stop 625 is provided for part 622B. As a result of these stops, the two parts 622A and 622B are prevented from rotating past the position in which they would be in an approximately radial plane from the axis 483 two the edges of the end structures 485 and 486. In the preferred embodiments, similar stops 626A and 626B also are provided so that each of the paddle parts 622A and 622B is constrained to moving within an approximately 90° range. Also in the preferred embodiments, four paddles, each identical to paddle 622, are provided an equal (90°) offsets from each other.

Figure 26:
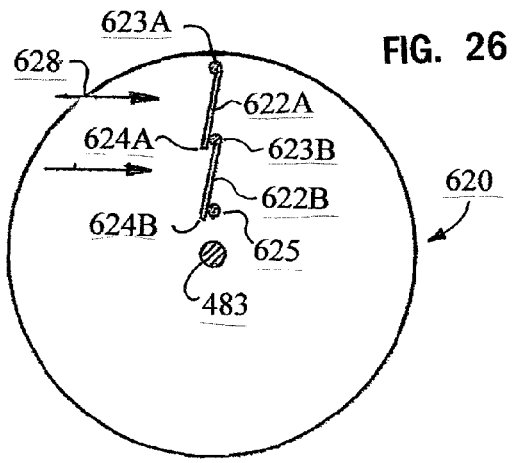
FIG. 26 is a side sectional view of a portion of a paddlewheel having swinging or pivoting two-part rigid paddles, showing a single two-part paddle in its maximum power position, with the paddle surface area being approximately perpendicular to the direction of the current flow.

FIG. 26 is a side sectional view of a portion of paddlewheel 620, showing the single illustrated paddle 622 in its maximum power position. More specifically, the water current flow 628 from front to rear pushes the paddle parts 622A and 622B in the counterclockwise direction (when viewed from the left side as shown in FIG. 26) until their distal edges 624A and 624B abut stops 623B (which is actually the pivot rod for part 622B) and 625, respectively. At this point, the surface area of paddle 622 is approximately perpendicular to the direction of the current flow 628, thereby capturing the maximum amount of energy possible.

Figure 27:
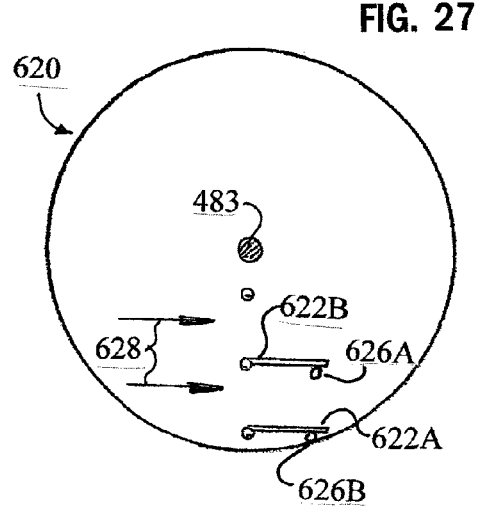
FIG. 27 is a side sectional view of a portion of a paddlewheel having swinging or pivoting two-part rigid paddles, showing a single two-part paddle when moving in the opposite direction of the current flow, with the paddle surface area having pivoted so as to be approximately parallel to the direction of the current flow.

In FIG. 27, paddlewheel 620 has rotated 180° clockwise, so that the illustrated paddle 622 is now along its bottom edge. Here, paddle parts 622A and 622B have rotated clockwise from their previous positions in response to water current 628 so that they are approximately parallel to the water current 628. That is, they offer less resistance when they are moving in the direction opposite to that of the current flow 628.

Figure 28:
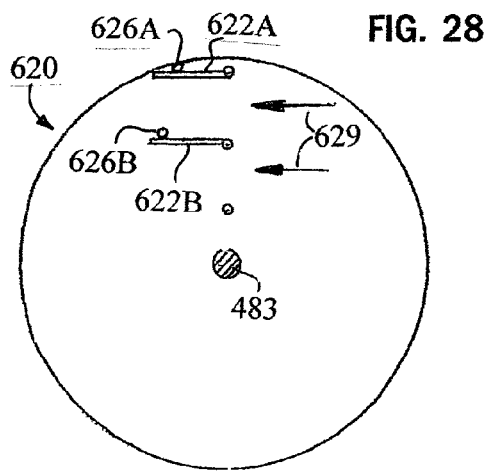
FIG. 28 is a side sectional view of a portion of a paddlewheel having swinging or pivoting two-part rigid paddles, showing the paddle in the same relative position as in FIG. 26, but with the current flow from the opposite direction as compared to FIG. 26.
Figure 29:
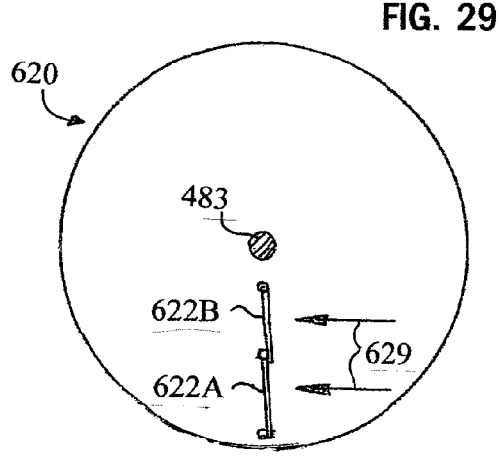
FIG. 29 is a side sectional view of a portion of a paddlewheel having swinging or pivoting two-part rigid paddles, showing the paddle in the same relative position as in FIG. 27, but with the current flow from the opposite direction as compared to FIG. 27.

FIGS. 28 and 29 then illustrate the situation when the current flow 629 is from the opposite direction (i.e., rear to front). Here, the paddle parts 622A and 622B are parallel to the water current flow 629 when they are at the top portion of the paddlewheel 620 and are perpendicular to the current flow 629 when they rotate into the bottom portion of the paddlewheel 620. In other words, in this case, the power position is at the bottom of the paddlewheel 620. Irrespective of the direction of the current flow (i.e., front to rear 628 or rear to front 629), the paddlewheel 620 rotates in the clockwise direction (when viewed from the left side as shown in FIGS. 26-29).

Thus, hinged, pivoting and/or collapsing paddles (as in the previous embodiment) often can provide less resistance to water current during that portion of their rotation when they are moving in the direction opposite to the current flow. Nevertheless, alternate designs that use fabric or fabric-like paddles often can result in even better performance, e.g., more efficient and less complex paddles with fewer moving parts, thereby increasing the paddle's life span, as well as reducing fabrication and maintenance costs. In addition, a rigid paddle, even one that is hinged and capable of pivoting, is limited in its ability to form itself into an optimal shape at each position throughout its rotation.

Figure 30:
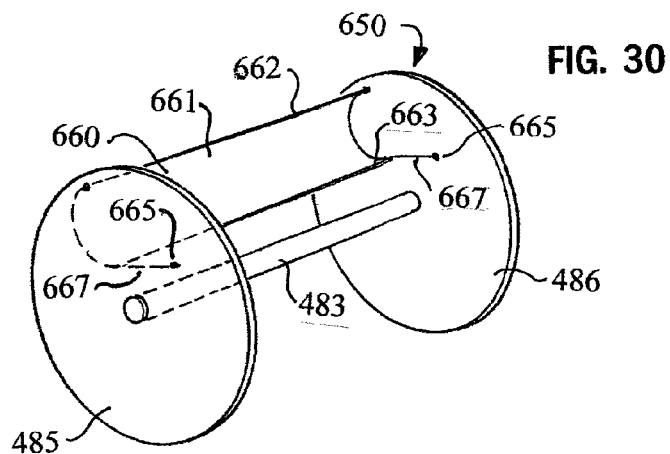
FIG. 30 is a perspective view of a portion of a paddlewheel having fabric or fabric-like paddles with one pivotally attached edge and one edge that is free to move, within a region constrained by the use of a tether.

FIG. 30 illustrates an example of a portion of a paddlewheel 650 having fabric or fabric-like paddles with a constrained pivoting ability. For ease of illustration, only a single paddle 660 (having the same basic structure as paddle 476, described above) is shown in FIG. 30, although in the preferred embodiments multiple such paddles are provided at equal angular intervals (e.g., four paddles at 90° intervals). As with paddle 476 (discussed above), paddle 660 preferably includes a sheet of fabric or fabric-like material 661 suspended between two elongated members 662 and 663. However, unlike paddle 476, elongated member 662 for paddle 660 preferably is pivotally attached (e.g., hinged) near the outer edges (or perimeters) of end structures 485 and 486, so that it is capable of rotating relative to end structures 485 and 486, and elongated member 663 is not directly attached to end structures 485 and 486, but rather is free to move, subject to the constraints described below.

In this regard, each of end structures 485 and 486 preferably includes a fixed anchor position 665 on its inner surface. A tether 667 (e.g., a cord, cable, rope, line or strap, preferably made of a pliable and/or supple material) is then attached between each such fixed anchor position 665 and the corresponding end of elongated member 663. As a result, elongated member 663 is capable of moving freely, subject to the constraints imposed by tethers 667.

Figure 31:
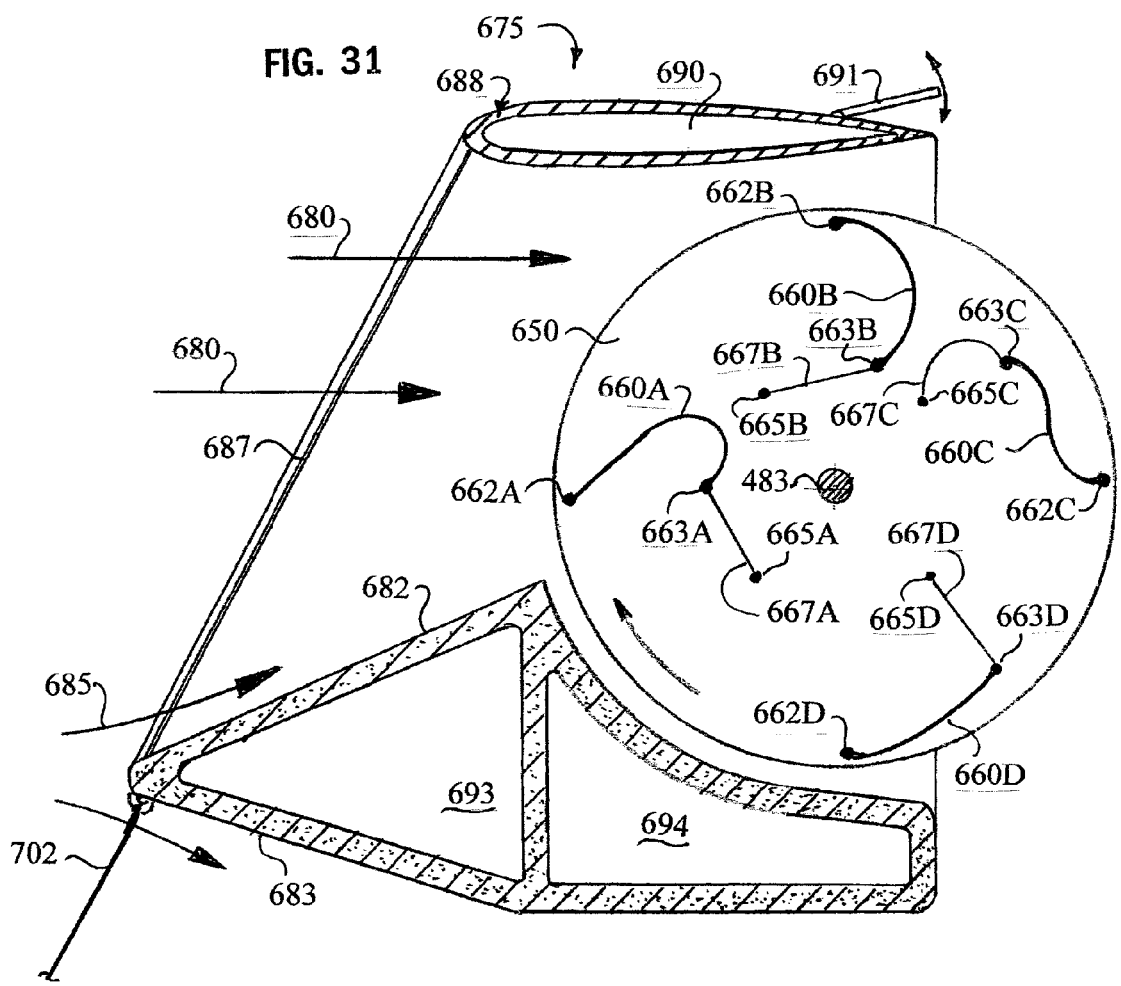
FIG. 31 is an in-use side sectional view of an energy-generating unit using fabric or fabric-like paddles that have a constrained pivoting ability.

An example of an energy-generating unit 675 that includes an entire paddlewheel 650 is shown in FIG. 31. In this example, paddlewheel 650 includes four paddles 660A-D, each having a pivotally attached elongated member 662A-D, respectively, and a constrained free-moving elongated member 663A-D, respectively, the latter being attached to a corresponding fixed anchor position 665A-D via a corresponding tether 667A-D.

In the example illustrated in FIG. 31, the water current flow 680 is from front to rear, and the shape of the main structure of energy-generating unit 675 directs the current flow 680 primarily across the top of the paddlewheel 650. In particular, a lower portion of the structure has an upwardly sloping upper surface 682 and a downwardly sloping lower surface 683 (both, in reference to the horizontal plane and movement toward the paddlewheel 650), so that the structure becomes thinner as it extends further forward of the paddlewheel. Because a larger volume of water is directed across the top half of the paddlewheel 650, the paddlewheel 650 turns in a clockwise direction (from the left-end perspective shown in FIG. 31). In the preferred embodiments, the slopes of both the upper surface 682 and the lower surface 683 are approximately equal (again, both with reference to the horizontal plane).

The various paddle configurations throughout the rotation of the paddlewheel 650 are visible in FIG. 31. Paddle 660A is largely parallel to the direction of the current flow 685 that has been deflected by upper surface 682, except for a pocket formed near the end that is defined by elongated member 663A. Paddle 660B is largely perpendicular to the direction of principal water current flow 680, with tether 667B being stretched taut and elongated member 663B being pushed toward the rear of paddlewheel 650, and the sheet of fabric or fabric-like material having been formed into a concave shape. Paddle 660C does not have a highly defined shape, due to the nature of the current flow at that point, and even tethers 667C only loosely connect the elongated member 683C to anchor position 665C. Due to its movement against the current flow 680 (or even just against water resistance), paddle 660D is largely parallel to the direction of relative current flow (i.e., relative to the motion of the paddle itself), with tether 667D being stretched taut in an approximately radial direction.

It is noted that due to the locations of the anchor positions 665A-D (i.e., a distance opposite the direction of rotation and closer toward the axle 483 of the paddlewheel 650 than the point of attachment of the corresponding pivotally attached elongated member 662A-D), the individual paddles 660A-D naturally form into appropriate shapes at each position along their rotation around the paddlewheel 650. Thus, for example, with reference to FIG. 31, when the paddle is in the maximum power position (as is paddle 660B), the farthest that elongated member 663B can be pushed by the water current 680 results in the illustrated concave shape for paddle 660B, efficiently capturing the water current energy. On the other hand, when the paddle is moving against the current flow or against water resistance (at the bottom of the paddlewheel 650, as is paddle 660D), elongated member 663D can be pushed much further back by the relative water current 680, effectively flattening out paddle 660D and thereby decreasing its resistance to the relative water current 680.

In short, power generation is increased when the paddles are in the power position, and water resistance is decreased when the paddles are moving against the relative flow of the water. This structure is in some ways analogous to the operation of a sail on a sailboat.

Figure 32:
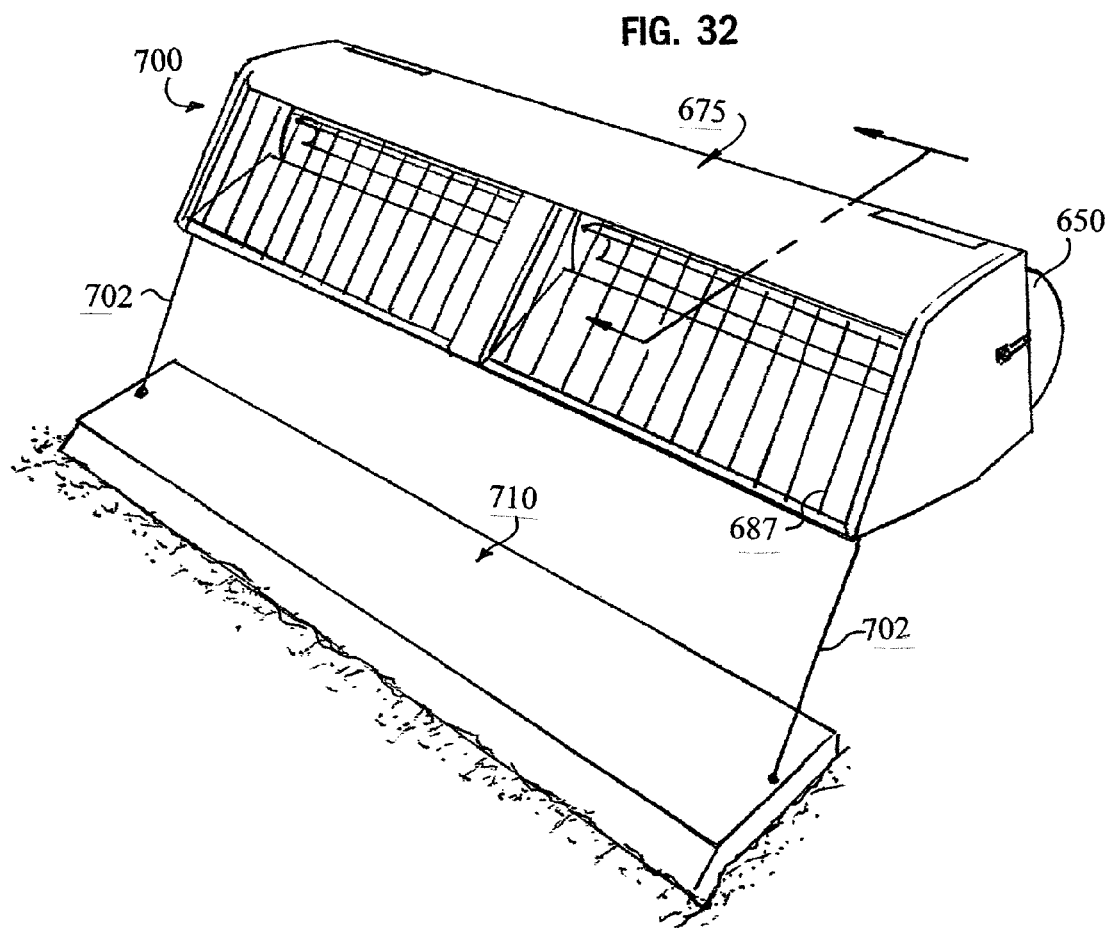
FIG. 32 is a perspective view of an energy-generating system that uses fabric or fabric-like paddles having a constrained pivoting ability.

FIG. 32 is a perspective view of an energy-generating system 700 that uses energy-generating unit 675. As shown, energy-generating unit 675 floats in the water (under the surface) and is attached, via anchor cables 702 to anchor 710 (preferably, a concrete re-floatable anchor, such as described above).

To protect paddlewheel 650 from debris in the water and to protect sea life from being drawn into paddlewheel 650, energy-generating unit 675 preferably is provided with a screen or grill 687. A top structure 688 includes a buoyancy tank 690 and a stabilizing flap 691. The bottom structure includes a front buoyancy tank 693 and a rear buoyancy tank 694, e.g., to assist in front-to-rear leveling.

In the preceding paddlewheel embodiment, each paddle primarily is made of a fabric or fabric-like material, has one edge that is pivotally attached to the left and right side structures (preferably at points that are near the outer edges of such side structures), and has another edge that is capable of moving freely, subject to a constraint imposed by the paddle's tether 667. The concepts of a pivoting fabric or fabric-like paddle preferably can be incorporated into other embodiments as well, e.g., using different means for constraining movement of the paddle's free edge.

Figure 33:
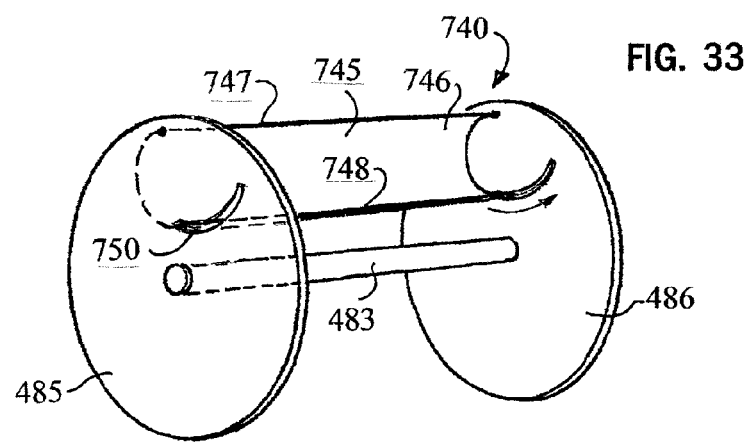
FIG. 33 is a perspective view of a portion of a paddlewheel having fabric or fabric-like paddles with one pivotally attached edge and one edge that is free to move, within a curve defined by a provided channel.

For instance, FIG. 33 is a perspective view of a portion of a paddlewheel 740. Specifically, for ease of illustration, only one paddle 745 is shown in FIG. 33. Like paddle 660 (discussed above), paddle 745 includes a sheet of fabric or fabric-like material 746 suspended from two elongated members 747 and 748, with member 747 being pivotally attached to each of the end structures 485 and 486, and with member 748 being free to move in a constrained manner. However, rather than using a tether to constrain movement of elongated member 748, a channel 750 has been provided on the inner surface of each of end structures 485 and 486 (although it is only visible on end structure 485 due to the perspective nature of FIG. 33). In the complete paddlewheel 740 of the present embodiment, four paddles 750 are provided at equal (90°) angular offsets from each other.

Figure 34:
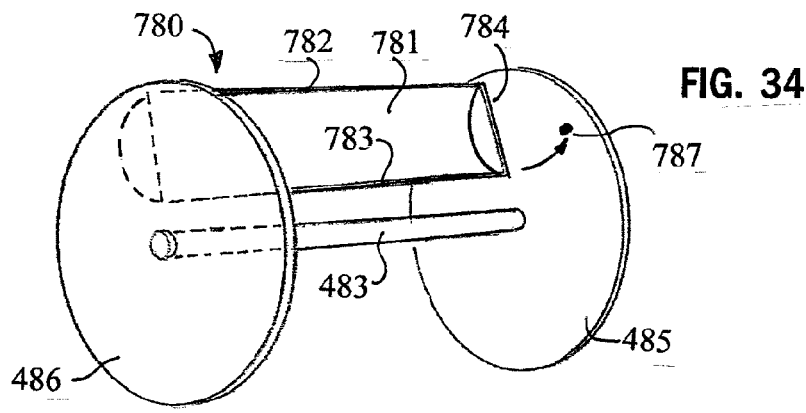
FIG. 34 is a perspective view of a portion of a paddlewheel having fabric or fabric-like paddles with one pivotally attached edge and one edge that is free to move, within an arc constrained by the use of a rigid frame and provided stops.

In another embodiment of a paddlewheel 780, partially illustrated in FIG. 34, the fabric or fabric-like material of paddle 781 is suspended within a frame that includes a pivotally attached elongated member 782 and a movable elongated member 783, but also includes a support member 784 at each end (although only the support member 784 near the right end structure 485 is visible in FIG. 34) that rigidly attaches elongated member 783 to elongated member 782. As a result, member 783 is constrained to move within the defined arc. In addition, stops 787 are provided to constrain the movement of paddle 781 two and arc of approximately 90°, from an orientation that is approximately radial to an orientation that is approximately tangential to end structures 485 and 486.

It is noted that in any of the foregoing structures, the paddles pivot from a power position in which they have the maximum surface area exposed to the water current to a hydrodynamic position in which they can move in the opposite direction of the relative current flow with reduced water resistance. At the same time, because each uses a fabric or fabric-like material the precise shape of the paddle can be formed dynamically, e.g., for increased efficiency. Although the embodiments discussed herein generally assume that the pivoting ability is provided by pivotally attaching one of the elongated members to the end structures of the paddlewheel, such pivoting also (or instead) can be provided simply by loosely attaching the sheet of fabric or fabric-like material to the elongated member.

In the embodiments described above, the paddlewheel typically has four individual paddles and solid, circular (or disc-shaped) end structures. However, different variations are possible.

Figure 35:
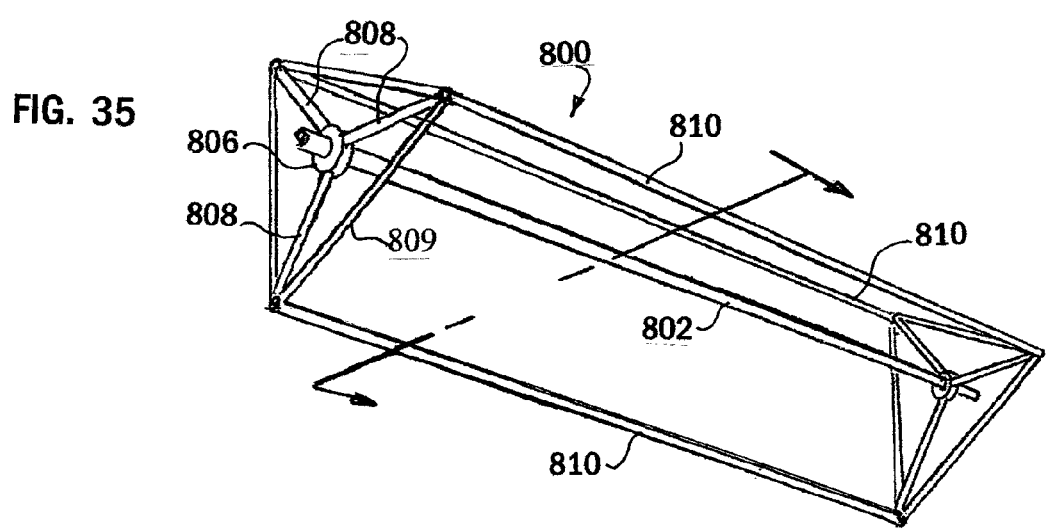
FIG. 35 is a perspective view of the support frame for a three-paddle paddlewheel.
Figure 36:
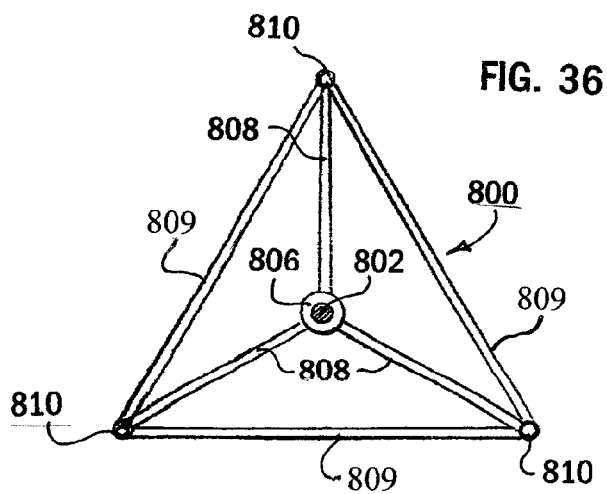
FIG. 36 is a center sectional view of the support frame for a three-paddle paddlewheel.

For instance, FIGS. 35 and 36 show the support frame 800 for a three-paddle paddlewheel. An axle 802 is attached at each end to a hub 806, which also is attached through struts 808 to an equilateral triangular tubular frame 809. The two end structures (each consisting of a hub 806, struts 808 and an equilateral triangular tubular frame 809) are attached to each other by support rods 810.

Figure 37:
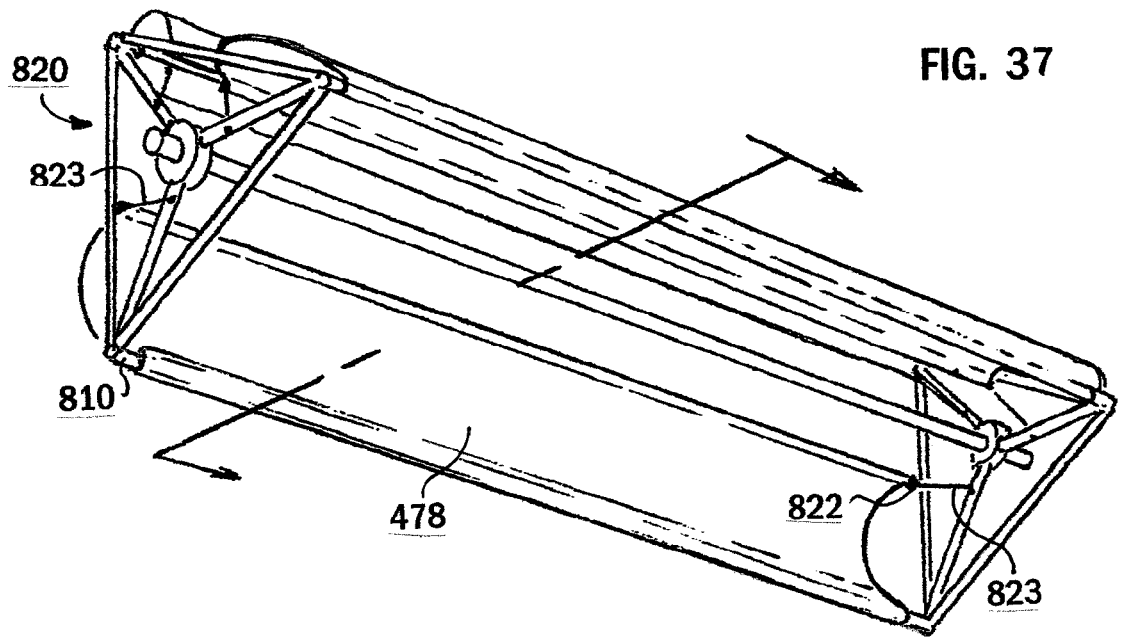
FIG. 37 is a perspective view of a three-paddle paddlewheel.

FIG. 37 shows the completed paddlewheel 820. To complete the paddlewheel 820 starting from the frame 800, a sheet 478 of fabric or fabric-like material is attached to each of the support rods 810 by looping the sheet material around the corresponding rod 810 and sewing or otherwise joining the overlapping portions. By keeping the loop relatively loose, the sheet 478 is able to pivot around the corresponding rod 810, although it is possible to also (or instead) attach the rods 810 so they are able to rotate (e.g., depending upon known engineering trade-offs). The opposite edge of each sheet 478 is attached to another rod 822 (e.g., in the same manner that the sheet 478 is attached to rod 810). Preferably, five 822 is able to move freely, except that each end of rod 822 is attached via a tether 823 to the strut 808 to the support rod 810 for the current paddle.

Figure 38:
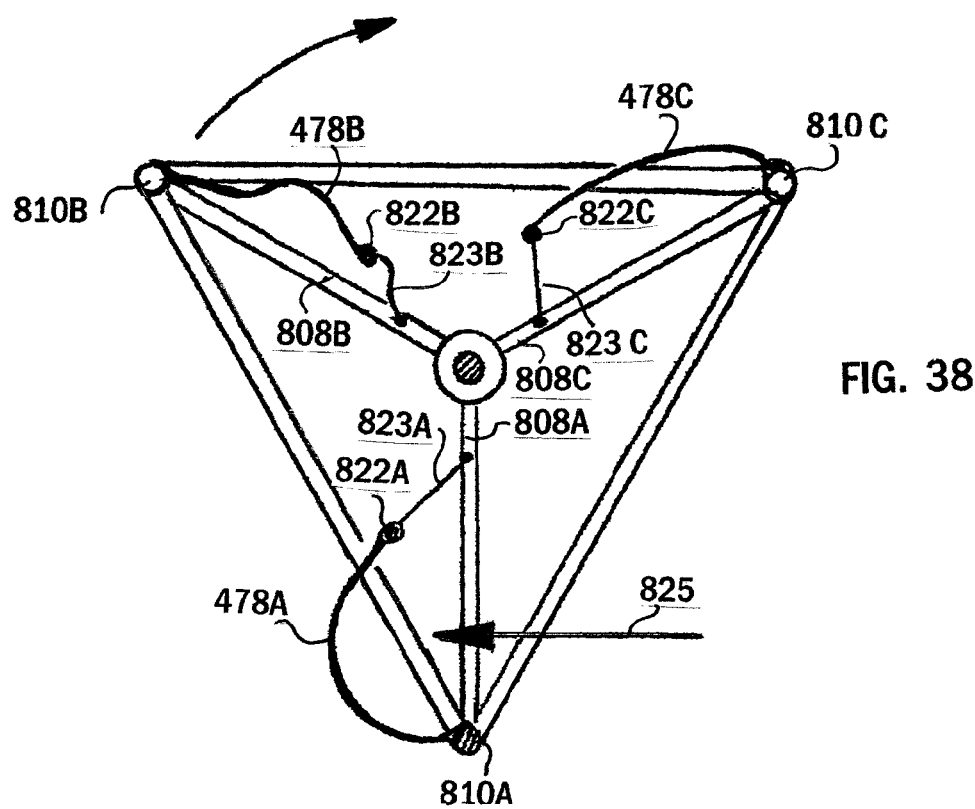
FIG. 38 is a center sectional view of a three-paddle paddlewheel in use.

As shown in FIG. 38, this structure performs similarly to the other fabric pivoting paddle structures described above. In particular, when a paddle is in the power position the maximum surface area of the sheet (e.g., sheet 478A) is perpendicular to the direction of the current flow 825. Otherwise, as indicated by sheets 478B (and 478C, when the paddle is moving in the opposite direction of the relative current flow, the sheet tends to orient itself so as to reduce water resistance. As indicated, sheet 478A is attached to support rod 810A and movable rod 822A, which in turn is attached to strut 808A via tether 823A; sheet 478B is attached to support rod 81BA and movable rod 822B, which in turn is attached to strut 808B via tether 823B; and sheet 478C is attached to support rod 810C and movable rod 822C, which in turn is attached to strut 808C via tether 823C.

Energy-Generating Units with Alternate Housings.

In the embodiments described above, each of the energy-generating units has a housing in which a front baffle exhibits mirror symmetry with a rear baffle, and both cover either the top portion or the bottom portion of the paddlewheel. However, it should be noted that such mirror symmetry is not necessary and, in certain embodiments, is not even desirable.

Figure 39:
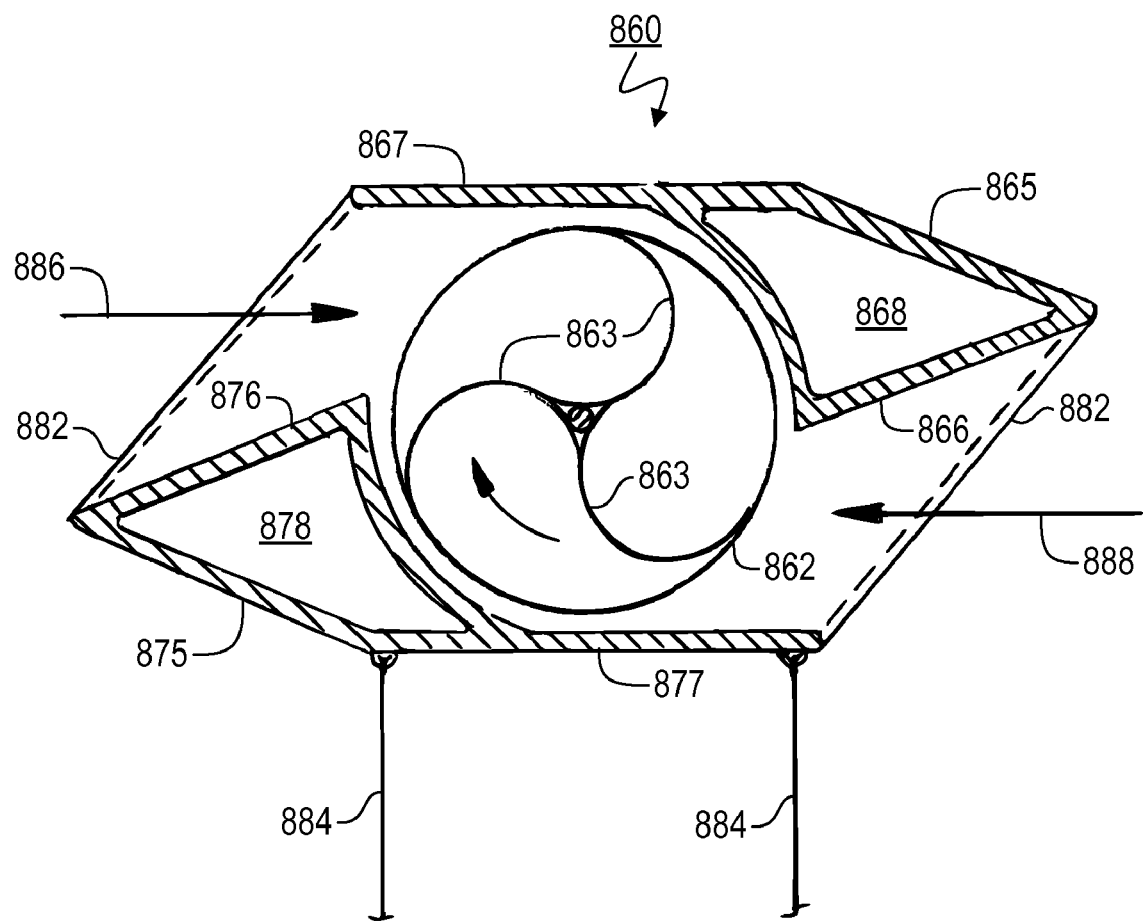
FIG. 39 is a side sectional view of an energy-generating unit having a diagonally symmetric housing.

One example of an energy-generating unit 860 having an alternately configured housing is shown in FIG. 39. In particular, energy-generating unit 860 employs a housing having diagonal symmetry. In this particular example, a paddlewheel 862 having three paddles 863 is used. However, the same housing can be used with a paddlewheel having any other number of paddles.

As shown in FIG. 39, the housing for energy-generating unit 860 mainly consists of two portions. A top portion 865 includes a rear baffle portion 866 extending rearwardly of the paddlewheel 862 (tapered, becoming thinner as it extends further behind the paddlewheel 862) and a flat middle portion 867. A bottom portion 875 includes a front baffle portion 876 extending in front of the paddlewheel 862 (tapered, becoming thinner as it extends further in front of the paddlewheel 862) and a flat middle portion 877. For purposes of controlling buoyancy and for leveling energy-generating unit 860, one or more ballast tanks 868 is provided within the rear baffle portion 866 and, similarly, one or more ballast tanks 878 is provided within the front baffle portion 876. Finally, a screen 882 covers each of the front and rear openings, and cables 884 extend from the bottom portion 875 of the housing to an anchor (not shown).

As a result of this configuration, a water current of 886 flowing into the front opening of the housing is directed across the top portion of the paddlewheel 862, causing the paddlewheel 862 to rotate in the clockwise direction (from the view shown in FIG. 39), and a water current of 888 flowing into the rear opening of the housing is directed across the bottom portion of the paddlewheel 862, also causing the paddlewheel 862 to rotate in the clockwise direction (from the view shown in FIG. 39). It should be readily apparent that the foregoing configuration is identical to one in which the front baffle portion covers the top portion of the paddlewheel 862 and the rear baffle portion covers the bottom portion of the paddlewheel 862, which would be the appearance of energy-generating unit 860 if viewed from the opposite side of the view shown in FIG. 39.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for generating energy from water current, comprising:
    a paddlewheel having plural individual paddles, an axis of rotation, a front side that is forward of the axis of rotation, and a rear side that is behind the axis of rotation; and
    a covering structure having a front portion that (a) covers a first part of the front side of the paddlewheel, leaving a second part of the front side of the paddlewheel uncovered by said front portion and (b) extends a distance forward of the front side of the paddlewheel,
    wherein the front portion of the covering structure is tapered, becoming thinner as it extends further forward of the paddlewheel,
    wherein when in use, the entire paddlewheel is exposed to, and turns in, the water,
    wherein the covering structure includes at least one ballast tank for controlling overall buoyancy of said apparatus, and
    wherein, when in use, said apparatus is held in place by being attached to an anchor.

2. An apparatus according to claim 1, wherein the first part of the front side of the paddlewheel that is covered by said front portion is a bottom portion of the paddlewheel, and the second part of the front side of the paddlewheel that is uncovered by said front portion is a top portion of the paddlewheel.

3. An apparatus according to claim 1, further comprising at least one additional paddlewheel that has the same axis of rotation as the paddlewheel and is also partly covered by the covering structure.

4. An apparatus according to claim 1, wherein the covering structure also has a rear portion that has mirror symmetry with the front portion.

5. An apparatus according to claim 1, wherein the covering structure also has a rear portion that has diagonal symmetry with the front portion.

6. An apparatus according to claim 1, further comprising a generator coupled to and turned by the paddlewheel.

7. An apparatus according to claim 1, wherein said apparatus is at least 75 feet wide, as measured along the axis of rotation.

8. An apparatus according to claim 1, wherein the covering structure also has a rear portion and each of the front portion and the rear portion has at least one ballast tank for controlling overall buoyancy of said apparatus.

9. An apparatus according to claim 1, wherein the covering structure also includes a rear portion, and wherein the rear portion is tapered, becoming thinner as it extends further rearward of the paddlewheel.

10. An apparatus according to claim 1, wherein each of the individual paddles is fixed into position so that it extends outwardly from the axis of rotation.

11. An apparatus according to claim 1, wherein the first part of the front side of the paddlewheel that is covered by said front portion is a top portion of the paddlewheel, and the second part of the front side of the paddlewheel that is uncovered by said front portion is a bottom portion of the paddlewheel.

12. An apparatus according to claim 11, wherein a top surface of the front portion of the covering structure is sloped downwardly relative to the horizontal plane as said top surface extends further forward of the paddlewheel, and a bottom surface of the front portion of the covering structure is sloped upwardly relative to the horizontal plane as said bottom surface extends further forward of the paddlewheel.

13. An apparatus according to claim 11, wherein a top surface of the front portion of the covering structure is substantially horizontal, and the bottom surface of the front portion of the covering structure is sloped upwardly relative to the horizontal plane as said bottom surface extends further forward of the paddlewheel.

14. An apparatus according to claim 13, wherein the top surface of the front portion of the covering structure functions as at least one of a floating dock or a pontoon bridge when said apparatus is in use.

15. An apparatus according to claim 1, wherein said apparatus has positive buoyancy when in use.

16. An apparatus according to claim 15, wherein the covering structure is fabricated primarily from concrete.

17. An apparatus according to claim 1, wherein each of a plurality of the individual paddles comprises a suspended sheet of pliable material.

18. An apparatus according to claim 17, wherein the suspended sheet of pliable material is water resistant.

19. An apparatus according to claim 17, wherein the sheet of pliable material is a fabric material.

20. An apparatus according to claim 17, wherein the suspended sheet of pliable material is suspended along just two opposite sides by a pair of elongated members.

21. An apparatus according to claim 20, wherein the elongated members are rods.

22. An apparatus according to claim 20, wherein the paddlewheel also includes a left end structure at a left end of the axis of rotation and a right end structure at an opposite right end of the axis of rotation, and wherein at least one of said elongated members is attached to the left end structure at one of its ends and is attached to the right end structure at its opposite end.

23. An apparatus according to claim 22, wherein each of said first elongated member and said second elongated member is fixedly attached to each of the left end structure and the right end structure such that each of the plurality of individual paddles extends outwardly from the axis of rotation.

* * * * *